(12) United States Patent
Hoshi et al.

(10) Patent No.: US 8,255,756 B2
(45) Date of Patent: Aug. 28, 2012

(54) WIRELESS COMMUNICATION APPARATUS, WIRELESS LAN SYSTEM, INTERFERENCE DETECTING METHOD, AND INTERFERENCE AVOIDANCE METHOD

(75) Inventors: Yoshiyuki Hoshi, Kanagawa (JP); Yasuharu Hashimoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 542 days.

(21) Appl. No.: 12/375,383

(22) PCT Filed: Jan. 18, 2007

(86) PCT No.: PCT/JP2007/050694
§ 371 (c)(1),
(2), (4) Date: Sep. 23, 2009

(87) PCT Pub. No.: WO2008/012954
PCT Pub. Date: Jan. 31, 2008

(65) Prior Publication Data
US 2010/0037124 A1 Feb. 11, 2010

(30) Foreign Application Priority Data
Jul. 27, 2006 (JP) .................................. 2006-205395

(51) Int. Cl.
*G08C 25/02* (2006.01)
(52) U.S. Cl. ....................................................... 714/748
(58) Field of Classification Search .................... 714/748
See application file for complete search history.

(56) References Cited

U.S. PATENT DOCUMENTS

| | | | | |
|---|---|---|---|---|
| 5,701,311 A * | 12/1997 | Kapoor | .......................... | 714/748 |
| 5,889,772 A * | 3/1999 | Fischer et al. | ................. | 370/346 |
| 6,947,479 B2 * | 9/2005 | Varma et al. | ................... | 375/224 |
| 7,103,817 B1 * | 9/2006 | Choksi | ........................... | 714/748 |
| 7,616,658 B2 * | 11/2009 | Harada et al. | ................. | 370/465 |
| 2002/0069388 A1 * | 6/2002 | Niu et al. | ........................ | 714/748 |
| 2002/0181417 A1 | 12/2002 | Malhotra | | |
| 2003/0126536 A1 * | 7/2003 | Gollamudi et al. | ............ | 714/748 |
| 2003/0131299 A1 * | 7/2003 | Ahn et al. | ...................... | 714/748 |
| 2004/0158790 A1 * | 8/2004 | Gaal et al. | ...................... | 714/748 |
| 2006/0089149 A1 | 4/2006 | Kizu | | |
| 2006/0221847 A1 * | 10/2006 | Dacosta | ......................... | 370/252 |
| 2006/0268924 A1 * | 11/2006 | Marinier et al. | ............... | 370/445 |
| 2011/0119550 A1 * | 5/2011 | Fantaske | ....................... | 714/748 |

FOREIGN PATENT DOCUMENTS

| JP | 5-14290 A | 1/1993 |
|---|---|---|
| JP | 9-200846 A | 7/1997 |
| JP | 2003-37607 | 2/2003 |
| JP | 2006-128812 | 5/2006 |

OTHER PUBLICATIONS

Japanese Office Action dated Apr. 3, 2012.

* cited by examiner

*Primary Examiner* — Yolanda L Wilson
(74) *Attorney, Agent, or Firm* — Dickinson Wright PLLC

(57) ABSTRACT

A wireless communication apparatus, a wireless LAN system, an interference detecting method, and an interference avoidance method which detect the occurrence of a communication error caused by the occurrence of interference. A wireless communication apparatus (100) comprises a transmitted packet interference error detecting circuit (120) composed of an ED value detecting circuit (105) for measuring the ED value prior to packet transmission, an Ack error detecting circuit (106) for detecting an Ack error in the transmitted packet, and a transmitted packet interference error determining circuit (107). When the Ack error is detected in a packet transmitted on condition that the measured ED value exceeds the threshold value of interference determination, the apparatus (100) determines it to be an interference error.

4 Claims, 17 Drawing Sheets

| P | R (Mbps) | $R_T$ |
|---|---|---|
| P(A) | A | R(A) |
| P(B) | B | R(B) |
| P(C) | C | R(C) |

WIRELESS COMMUNICATION APPARATUS, WIRELESS LAN SYSTEM, INTERFERENCE DETECTING METHOD, AND INTERFERENCE AVOIDANCE METHOD

TECHNICAL FIELD

The present invention relates to a wireless communication apparatus, wireless LAN system, interference detecting method and interference avoidance method for detecting and avoiding interference where interference occurs.

BACKGROUND ART

In recent years, cases have become common where gained popularity where a wireless LAN (hereinafter "WLAN": Wireless Local Area Network") is built in an office, home and so on given the economic performance of the implementation cost. A typical example of WLAN is IEEE 802.11 standardized by the IEEE (Institute of Electrical and Electronics Engineers). This standardized technique defines layers in an OSI model from a physical layer to a MAC (Medium Access Control) layer, which is a lower layer of a data link, is substitutable for Ethernet, which is a wired LAN channel and is furthermore based on a specification capable of providing also a roaming function, which is an additional function taking advantage of being wireless.

Furthermore, the above-described WLAN, Bluetooth (registered trademark) and UWB (Ultra Wideband) are used as systems capable of accessing local networks other than a carrier. WLAN is widely used for a portable information terminal such as a portable notebook personal computer provided with a WLAN function and PDA (Personal Digital Assistants). For cellular phone sets requiring lower power consumption, small power short-distance bidirectional wireless communication schemes such as Bluetooth (registered trademark) and UWB are attracting attention.

When a transmitter and a receiver are communicating at a certain specific frequency (communication channel) on a wireless network, if another pair of transmitter and receiver use the same communication channel, the band of data transmission is reduced, and therefore devices that use the communication channel later need to automatically change the channel to a free communication channel.

As a wireless communication device that changes a communication channel, for example, Patent Document 1 discloses one in which a wireless communication section is provided with a 2.4 GHz band front-end circuit and a 5 GHz band front-end circuit to handle two frequency bands of 2.4 GHz band and 5 GHz band and to thereby drastically increase the number of channels simultaneously settable by a WLAN system in the same area and reduce the possibility that the communication link may be interrupted by jamming.

FIG. 1 shows a configuration of a wireless communication apparatus on a conventional WLAN. In FIG. 1, wireless communication apparatus 10 is constructed by including antenna 11, transmission/reception changeover switch (T/R SW) 12, WLAN transmitting circuit 13, WLAN receiving circuit 14 and WLAN control circuit 15.

Transmission/reception changeover switch (T/R SW) 12 switches a SW at transmission timing and reception timing. WLAN transmitting circuit 13 transmits a signal on the WLAN. WLAN receiving circuit 14 receives a signal on the WLAN. WLAN control circuit 15 controls WLAN transmitting circuit 13 and WLAN receiving circuit 14.

Compared to a wired LAN used since before WLAN was introduced, the WLAN can move each terminal that makes up the WLAN within a communicable range and has a high degree of portability, but the boundary marking the communicable range is ambiguous. Since the boundary marking the communicable range is ambiguous, when a plurality of neighboring WLANs exist, terminals may be located within a range in which communicable ranges of the plurality of WLANs overlap with each other. These terminals mutually receive their respective waves within the mutually neighboring WLANs, which may cause a problem of jamming and reduce throughput.

[Jamming Detection Technique]

As a meted of detecting the above-described jamming, for example, Patent Document 2 discloses a technique of detecting interference based on an ID reception rate of a BSS (Basic Service Set) received from other than an AP (Access Point) with which the own station is communicating. The jamming detecting method described in Patent Document 2 detects whether or not interference has occurred between BSSs based on an outside BSSID reception rate calculation section that calculates a reception rate of frames including IDs of other BSSs which are different from an ID of the corresponding BSS among all received frames and the outside BSSID reception rate calculated by this outside BSSID reception rate calculation section.

Furthermore, Patent Document 3 discloses a technique of identifying interference based on received power of a received signal transmitted from a wireless device other than an AP with which the own station is communicating. The jamming decision method described in Patent Document 3 is provided with a function of deciding the degree of interference from an interference amount monitoring signal outputted from a wireless interface section, changing the operating channel and thereby deciding whether or not interference should be avoided.

[Jamming Avoidance Technique]

When jamming is detected, the following interference avoidance method is adopted. Patent Document 4 discloses a technique of avoiding, when jamming is detected, the jamming by changing a frequency channel. The jamming avoidance method described in Patent Document 4 measures, when selectively setting a plurality of frequency channels in a wireless network system to access a device terminal via wireless communication, radio wave levels of a plurality of frequency channels based on a signal received through a radio antenna at predetermined intervals, compares the measured radio wave levels with a predetermined threshold, decides whether or not to use each frequency channel, stores each frequency channel as statistical data of the frequency of use and changes the frequency channel based on the statistical data as required in execution of wireless communication with the above-described device terminal.

Furthermore, when a communication error occurs, fallback control is performed which reduces the transmission rate and increases the transmission distance. However, dropping the transmission rate down to a minimum rate through fallback causes the throughput to decrease drastically. The technique described in Patent Document 5 provides, when an error occurs due to interference, reference throughput at the time of interference and controls the speed mode so as to reach the throughput to secure a certain level of throughput in order to avoid a drastic drop of throughput caused by a drop of the transmission rate to a minimum rate through fallback. More specifically, when the wireless communication apparatus detects the presence/absence of interference from an interfering device which operates in the same frequency band as the frequency band to be received by the wireless communication apparatus and operates based on a standard different from the standard used for communication of the wireless communication apparatus, the wireless communication apparatus sets a throughput that serves as a reference in changing the speed mode as an interference throughput and thereby changes the speed mode.

Patent Document 1: Japanese Patent Application Laid-Open No. 2002-33676
Patent Document 2: Japanese Patent Application Laid-Open No. 2006-109448
Patent Document 3: Japanese Patent Application Laid-Open No. 2004-357056
Patent Document 4: Japanese Patent Application Laid-Open No. 2005-333510
Patent Document 5: Japanese Patent Application Laid-Open No. 2005-278052

DISCLOSURE OF INVENTION

Problems to be Solved by the Invention

However, such conventional jamming avoidance methods have the following problems.

(1) In the event of interference, a communication error occurs under the influence of an interference wave, and therefore fallback is performed to drop a transmission rate. However, when the transmission rate is dropped by the fallback, the packet length increases, and this adversely causes a detrimental effect of being more susceptible to interference.

FIGS. 2A to C show a relationship between an interference wave and a communication carrier. As shown in FIG. 2A, interference waves occur periodically or in a burst-like manner. A communication carrier under jamming (see FIG. 2B) is controlled so as to drop a transmission rate through fallback in the same way as in a case where a communication error has occurred and extend the transmission distance (see FIG. 2C). The above-described communication carrier refers to a packet length of a frequency band in which the wireless communication apparatus performs transmission/reception here, and upon detecting an interference wave, the wireless communication apparatus performs fallback control that changes a throughput setting and drops a transmission rate. As shown in FIG. 2C, through the fallback, the packet length is increased and the communication packet extends on the time axis, and therefore the communication packet after the fallback is more likely to collide with the next interference wave. That is, fallback always causes the communication packet to be directed in a direction in which the communication packet collides with an interference wave.

(2) In the case of a low rate, if a large number of retransmissions in the event of interference is set, jitter in a wireless interval (variation on the time axis) increases, and therefore the number of retransmissions is normally set to the order of 3 to 7 times.

FIG. 3 shows a relationship between an interference wave and the number of packet retransmissions.

In the case of a low rate, the number of retransmissions in a time domain in which an interference wave occurs is 3 to 7 to avoid jitter in the wireless interval. However, in the case of a high rate communication as shown in FIG. 3, since the packet length is small, even repeating retransmission 3 to 7 times cannot exceed the time domain in which an interference wave occurs and cannot avoid interference waves. That is, since the number of retransmissions is small, the time domain free of interference waves cannot be reached.

Above-described problems (1) and (2) will be explained in further detail.

FIGS. 4A and B show a relationship between an interference wave and the number of packet retransmissions, FIG. 4A illustrates above-described problem (1) and FIG. 4B illustrates above-described problem (2).

When a microwave is turned on in a frequency band of a communication carrier with which a wireless communication apparatus is carrying out transmission/reception, this microwave becomes a source of interference wave and the period in which the microwave is switched on becomes an interference period. The microwave produces jamming over a wide range of frequency band including a 2.4 GHz frequency band used by a WLAN and causes interference in a burst-like manner when the microwave is switched on and furthermore produces interference completely asynchronously with the WLAN. Furthermore, a beacon is periodically transmitted from an access point and has a packet length of about 1 msec.

Now, a case where the microwave intermittently is turned on (i.e. interference period) for 20 msec will be taken as an example. As shown in FIG. 4A, when interference occurs during transmission, control is performed so as to drop the transmission rate through fallback operation simultaneously with the occurrence of a communication error, and therefore retransmissions 1, 2, 3, . . . are executed with the result that the packet length is extended. However, since the packet size is large, it is impossible to pass through the gap between "ON" periods (interference periods) of the microwave, collision with an interference wave occurs, which makes communication impossible.

Furthermore, as shown in FIG. 4B, interference occurs during transmission and even when retransmissions 1, 2, 3, . . . are repeated, since the predetermined number of retransmissions is a small number, retransmissions exceeding the ON interval (i.e. interference period) of the microwave do not succeed and cannot avoid interference.

In this way, when affected by interference from a microwave or the like during a WLAN communication, the prior arts have a detriment of extended packet length due to a reduction of transmission rate through fallback and a problem that interference cannot be avoided with a predetermined number of packet retransmissions, making communication impossible.

The present invention has been implemented in view of the above-described problems and it is therefore an object of the present invention to provide a wireless communication apparatus, wireless LAN system, interference detecting method and interference avoidance method for detecting whether a communication error occurs due to occurrence of interference.

Furthermore, it is another object of the present invention to provide a wireless communication apparatus, wireless LAN system, interference detecting method and interference avoidance method capable of avoiding interference upon receiving influences of interference waves from an interference source such as a microwave during a WLAN communication.

Means for Solving the Problem

The wireless communication apparatus of the present invention adopts a configuration including: a communication status deciding section that decides a wireless communication status; a packet error detecting section that detects an error with a transmitted or received packet; and an interference error deciding section that decides, when the wireless communication status decided in the communication status deciding section shows a predetermined interference decision condition, an interference error from an interference source when an error is detected in the packet error detecting section.

The wireless communication apparatus of the present invention is a wireless communication apparatus that performs fallback control to reduce transmission rate when a communication error occurs, and adopts a configuration including an interference avoidance control section that stops, when an interference error is detected, the fallback control, fixes the transmission rate to a certain rate and increases the number of retransmissions compared to the count for during normal communication.

The wireless communication apparatus of the present invention is a wireless communication apparatus that performs rate control that increases a transmission rate when a communication error is corrected, and adopts a configuration including an interference avoidance control section that stops, when an interference error is detected, fallback control, fixes a transmission rate to a certain rate and increases the number of retransmissions compared to the count for during normal communication.

The wireless LAN system of the present invention is a wireless LAN system that connects a plurality of wireless communication apparatuses via a wireless network and adopts a configuration including the above-described wireless communication apparatus.

The interference detecting method of the present invention includes the steps of: measuring an energy detect value before packet transmission; detecting an acknowledgment error with respect to a transmitted packet; and identifying an interference error when the acknowledgment error is detected with respect to the packet transmitted under a condition that the measured energy detect value exceeds an interference deciding threshold.

The interference detecting method of the present invention includes the steps of: measuring an energy detect value before packet transmission; detecting a transmission error that a transmitted packet cannot be retransmitted in a predetermined number of retransmissions; and identifying an interference error when the transmission error is detected from the packet transmitted under a condition that the measured energy detect value exceeds an interference deciding threshold.

The interference detecting method of the present invention includes the steps of: measuring the noisefloor value which is the noise level of when a packet is received; detecting a reception error with the received packet including a frame check sequence error; and identifying an interference error when the reception error is detected from the packet received under a condition that the measured noisefloor value exceeds an interference deciding threshold.

The interference detecting method of the present invention includes the steps of: measuring the noisefloor value of when a beacon is received; detecting a reception error with a received packet including a frame check sequence error; and identifying an interference error when the reception error is detected with the packet received under a condition that the measured noisefloor value exceeds an interference deciding threshold.

The interference avoidance method of the present invention includes the steps of stopping, when an interference error is detected, fallback control to reduce transmission rate and fixing the transmission rate to a certain rate and increasing the number of retransmissions compared to the count for during normal communication.

Advantageous Effect of the Invention

The present invention makes it in fact possible to detect communication errors that occur due to occurrence of interference.

Furthermore, during WLAN communication, upon receiving the influence of interference waves from an interference source such as a microwave, it is possible to avoid interference and carry out communication.

BRIEF DESCRIPTION OF DRAWINGS

FIG. 15 shows an example of an interference avoidance table referred to by the rate/retransmission count determining circuit of the wireless communication apparatus according to the above embodiment;

BEST MODE FOR CARRYING OUT THE INVENTION

Hereinafter, embodiments of the present invention will be explained in detail with reference to the accompanying drawings.

Embodiments 1 to 3 are application examples of an interference detecting circuit and method and Embodiments 4 and 5 are application examples of an interference avoiding circuit and method.

(Embodiment 1)

Figure 5:
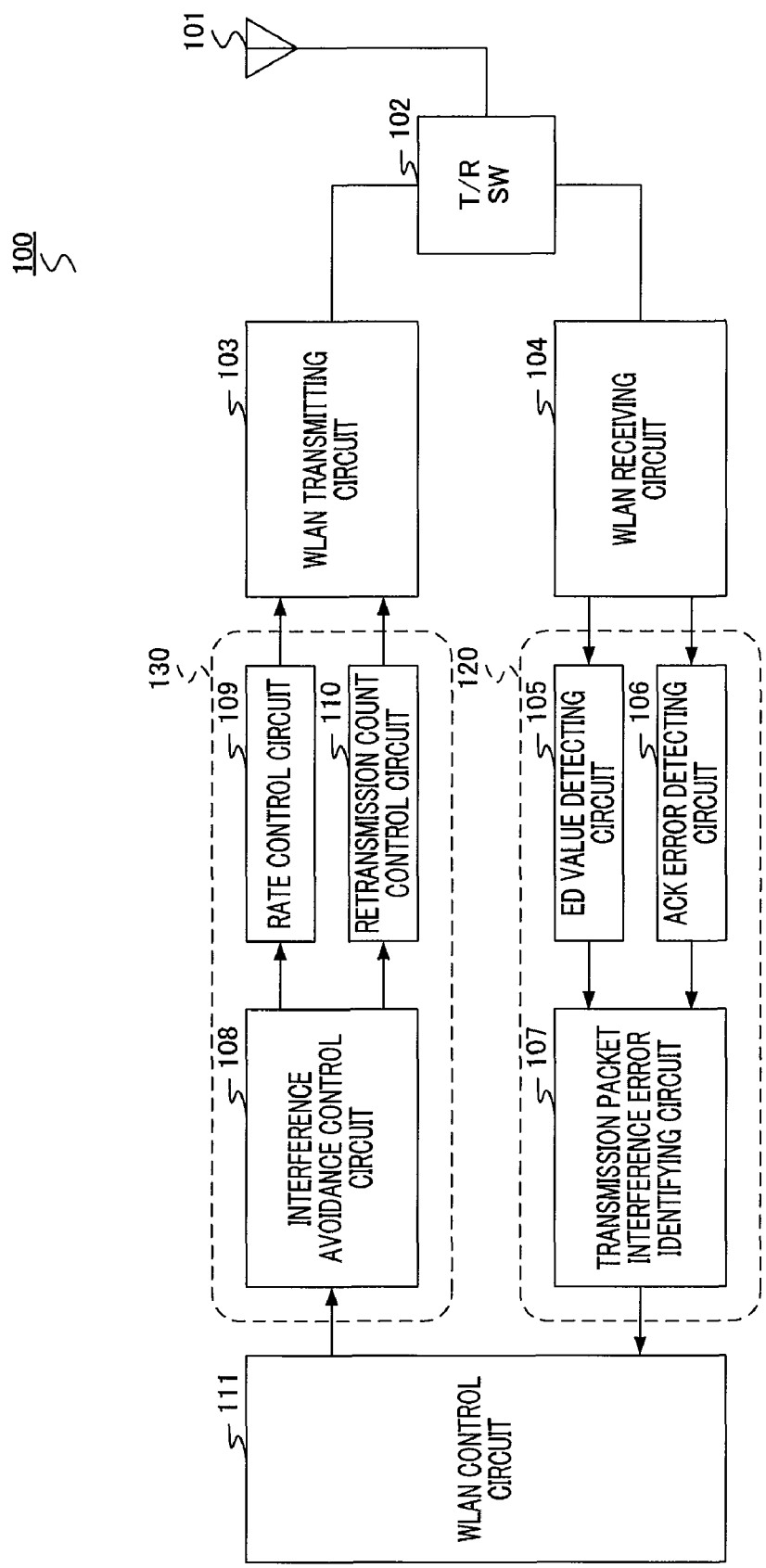
FIG. 5 is a block diagram showing a configuration of a wireless communication apparatus on a WLAN according to Embodiment 1 of the present invention.

FIG. 5 is a block diagram showing a configuration of a wireless communication apparatus on a WLAN according to Embodiment 1 of the present invention. The present embodiment is an example of application to a wireless communication apparatus on a WLAN.

In FIG. 5, wireless communication apparatus 100 is a wireless communication terminal, such as a cellular telephone device/PHS (Personal Handy-phone System) or a PDA that carries out wireless communication, and is provided with WLAN functions as a system that can access non-carrier local networks. Examples of information delivery services using non-carrier networks include low-power, short-distance, and bi-directional wireless communication schemes such as Bluetooth (registered trademark) and UWB, in addition to WLAN.

Wireless communication apparatus 100 is comprised of antenna 101, transmission/reception changeover switch (T/R SW) 102, WLAN transmitting circuit 103, WLAN receiving circuit 104, ED (Energy Detect) value detecting circuit 105, Ack error detecting circuit 106, transmission packet interference error identifying circuit 107, interference avoidance control circuit 108, rate control circuit 109, retransmission count control circuit 110 and WLAN control circuit 111.

Above-described ED value detecting circuit 105, Ack error detecting circuit 106 and transmission packet interference error identifying circuit 107 as a whole constitute transmission packet interference error detecting circuit 120, and above-described interference avoidance control circuit 108, rate control circuit 109 and retransmission count control circuit 110 as a whole constitute interference avoiding circuit 130.

Figure 1:
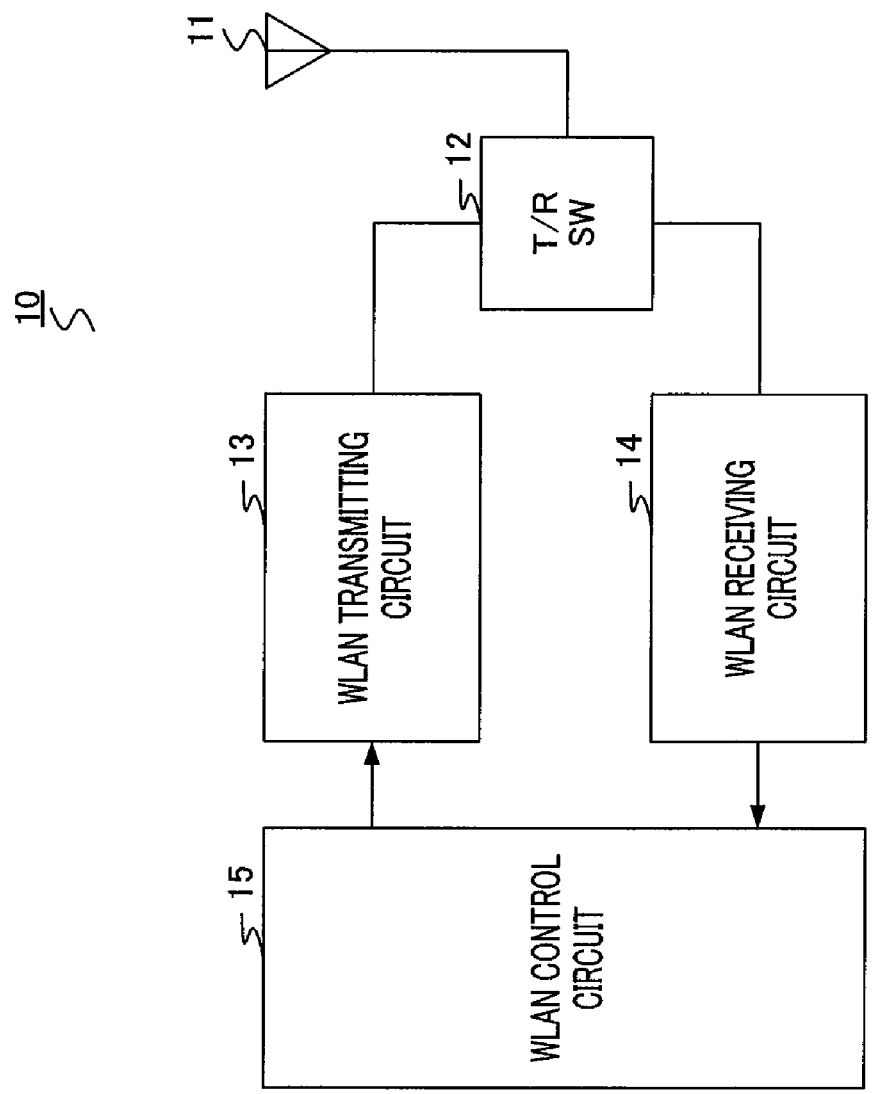
FIG. 1 shows a configuration of a wireless communication apparatus on a conventional WLAN.
Figure 2:
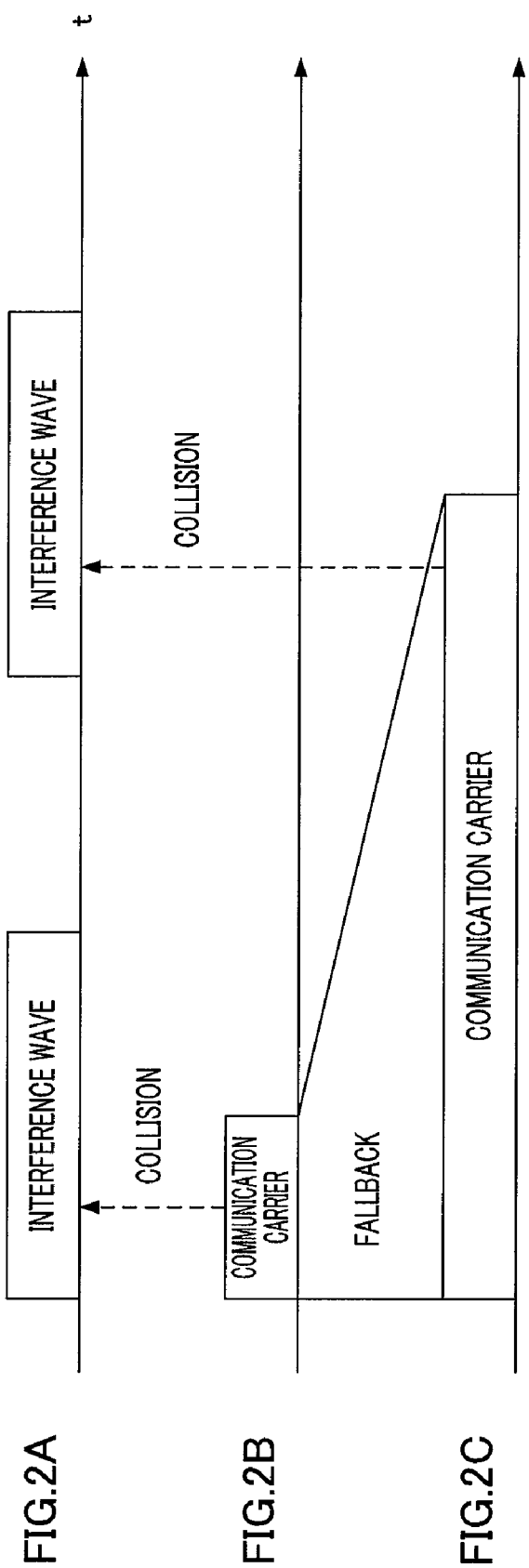
FIG. 2 shows relationships between interference waves and communication carriers.
Figure 3:
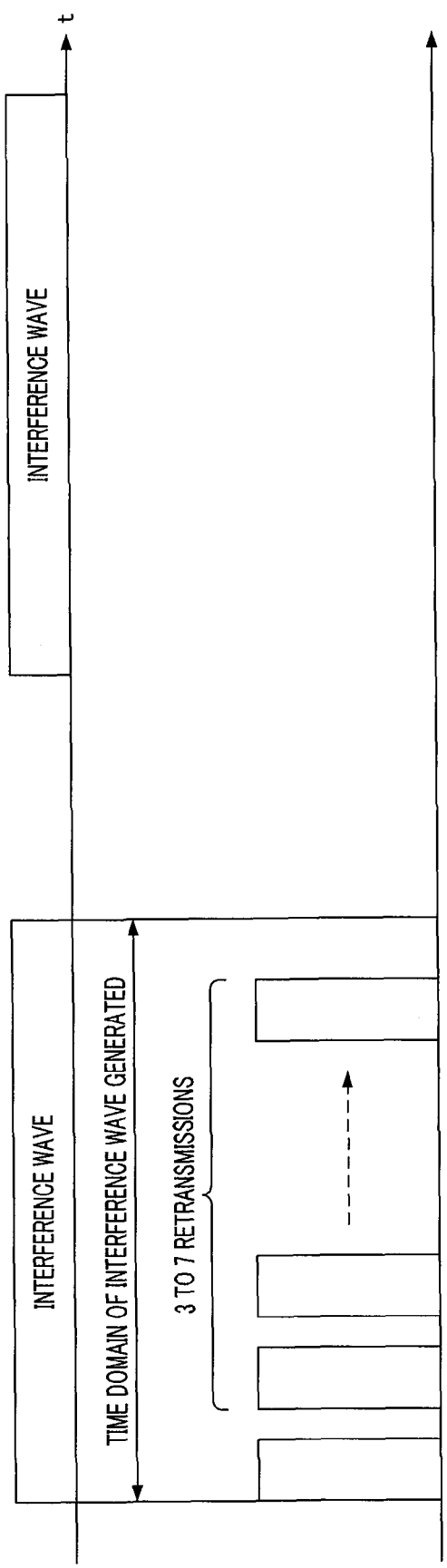
FIG. 3 shows a relationship between interference waves and the number of packet retransmissions.

Transmission/reception changeover switch (T/R SW) 102 switches a SW at transmission timing and reception timing. WLAN transmitting circuit 103 transmits signals on the WLAN. WLAN receiving circuit 104 receives signals on the WLAN. WLAN control circuit 111 controls WLAN transmitting circuit 103 and WLAN receiving circuit 104. These components have the same configuration as that of wireless communication apparatus 10 in FIG. 1.

[Configuration of Transmission Packet Interference Error Detecting Circuit 120]

ED value detecting circuit 105 measures the level (ED value) of interference waves before transmitting a packet, compares the level with an interference deciding threshold and decides that the level exceeds the threshold. ACK error detecting circuit 106 detects that an acknowledgment for the transmitted packet is lost. Transmission packet interference error identifying circuit 107 decides that a transmission packet interference error has occurred from the ED value detected in ED value detecting circuit 105 and the acknowledgment error detected in Ack error detecting circuit 106.

[Configuration of Interference Avoiding Circuit 130]

When an interference error occurs, interference avoidance control circuit 108 controls the transmission rate and the number of retransmissions, to avoid interference. Rate control circuit 109 actually changes the rate upon request from interference avoidance control circuit 108. Retransmission count control circuit 110 changes the retransmission count upon request from interference avoidance control circuit 108. The interference avoidance control by interference avoiding circuit 130 will be described later in detail in Embodiment 4 and Embodiment 5.

Hereinafter, the interference detecting method of the wireless communication apparatus configured as described above will be explained.

The prior arts only detect whether or not interference waves are produced and do not detect whether or not a communication error has occurred due to occurrence of interference waves. The present embodiment decides whether or not a communication error has occurred due to interference. That is, the present interference detecting method detects whether or not a communication error has actually occurred due to occurrence of interference. Examples of this interference detecting method include interference detecting methods for three packets, namely transmission packets, received packets and beacon, and now the interference error detecting method for transmission packets will be described with the present embodiment.

Figure 6:
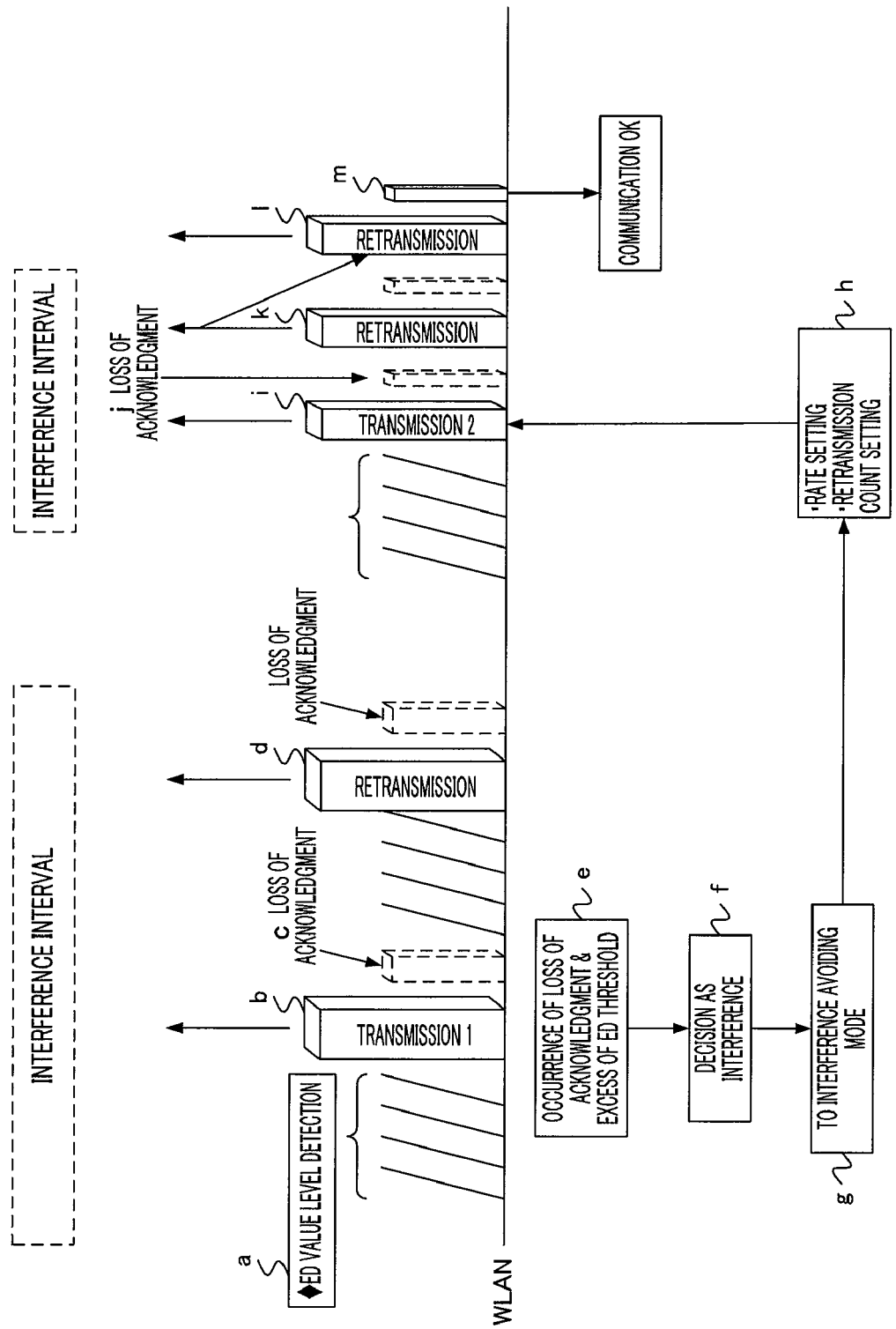
FIG. 6 illustrates a transmission packet interference error detecting method by the transmission packet interference error detecting circuit of the wireless communication apparatus according to the above embodiment.

FIG. 6 illustrates the transmission packet interference error detecting method by transmission packet interference error detecting circuit 120. This interference detecting method will be referred to as an "Ack error decision method."

During the normal operation of the WLAN, in order to detect whether or not there are communication carriers of other systems than WLAN before transmission of a transmission packet or detect whether or not interference waves from a microwave have occurred, ED (Energy Detect) value detection and carrier sensing (CS) for detecting the presence of WLAN communication carriers, are performed.

First, in transmission packet interference error detecting circuit 120, ED value detecting circuit 105 measures an ED value to be detected before packet transmission and Ack error detecting circuit 106 detects an Ack response from an AP (Access Point) to a packet transmitted under a condition of excess over prescribed interference deciding threshold. Transmission packet interference error identifying circuit 107 decides a transmission packet error by interference when an Ack response from the AP for the transmitted packet is lost.

The transmission packet interference error detecting method will be explained in more detail with reference to FIG. 6.

(1) Before transmitting a packet, ED value detecting circuit 105 measures an ED value to detect the level of interference waves transmitting in the neighborhood. The measured ED value is compared with a prescribed interference deciding threshold to decide whether or not the ED value exceeds the interference deciding threshold (see FIG. 6*a*). Next, packet transmission shown in FIG. 6*b* (transmission 1) is performed and this transmission 1 collides with an interference period during which a microwave is switched on or the like and an acknowledgment for the transmitted packet gets lost (see FIG. 6*c*). In response to the loss of acknowledgment, WLAN control circuit 111 makes WLAN transmitting circuit 103 retransmit the relevant packet (see FIG. 6*d*). This retransmission also collides with the interference period and acknowledgment gets lost.

(2) Apart from the above-described retransmission operation, transmission packet interference error detecting circuit 120 detects the loss of acknowledgment of the transmitted packet through Ack error detecting circuit 106 at the timing of FIG. 6*c*. That is, Ack error detecting circuit 106 makes an acknowledgment error decision as to whether or not acknowledgment for the transmitted packet has been detected. Now, suppose in FIG. 6*e* acknowledgment is lost and the ED value exceeds the interference deciding threshold.

(3) When the packet transmitted under a condition that the ED value detected in (1) above exceeds the interference deciding threshold contains an acknowledgment error, transmission packet interference error identifying circuit 107 identifies a transmission packet error due to interference (referred to as an "interference error") (see FIG. 6*f*). The prior arts detect the level of interference waves and decide that interference has occurred, and yet do not detect that an error has actually occurred in an environment in which interference waves have occurred.

Features of the present invention lie in detecting the interference wave level from the ED value and lie also in deciding whether or not a packet transmitted under a condition that interference waves are produced actually shows an error. Transmission packet interference error detecting circuit 120 of the present embodiment identifies an interference error when a packet transmitted under a condition that the measured ED value exceeds an interference deciding threshold, shows an acknowledgment error.

When transmission packet interference error detecting circuit 120 identifies an interference error, WLAN control circuit 111 makes interference avoiding circuit 130 enter an interference avoiding mode (see FIG. 6*g*).

The interference avoidance control by interference avoiding circuit 130 will be described later in Embodiment 4 and Embodiment 5.

To put it simply here, upon detecting interference, interference avoiding circuit 130 performs <rate setting> whereby the transmission rate is set to a prescribed rate and <retransmission count setting> whereby the retransmission count is fixed (see FIG. 6*h*).

Based on the interference avoidance control by interference avoiding circuit 130, the rate setting and retransmission count setting are performed and packet transmission (transmission 2) shown in FIG. 6*i* is carried out according to this rate setting and retransmission count setting. Here, this transmission 2 also collides with an interference period and acknowledgment to the packet transmitted is lost (see FIG. 6*j*). In response to this loss of acknowledgment, when WLAN control circuit 111 controls WLAN transmitting circuit 103 to repeat retransmitting the relevant packet (see FIG. 6*k*), retransmissions succeed after the interference period is over (see FIG. 6*l*), acknowledgment is received and communication is possible (see FIG. 6*m*).

The above-described speedy interference avoidance is made possible because, upon detection of an interference error by transmission packet interference error detecting circuit 120, interference avoiding circuit 130 immediately performs interference avoidance control with the rate setting and retransmission count setting.

As explained above, according to the present embodiment, wireless communication apparatus 100 is provided with transmission packet interference error detecting circuit 120 comprised of ED value detecting circuit 105 that measures an ED value before packet transmission, Ack error detecting circuit 106 that detects an acknowledgment error with respect to the transmitted packet and transmission packet interference error identifying circuit 107 and identifies an interference error when an acknowledgment error is detected from the packet transmitted under a condition that the measured ED value exceeds an interference deciding threshold, and therefore it is possible to detect that a communication error has actually occurred due to occurrence of interference. The prior arts are limited to only detecting whether or not interference waves are produced. On the other hand, the present embodiment can specify whether or not a communication error that occurs is an interference error, and allows handling corresponding to the communication error contents. For example, in the case of an interference error, interference avoidance control by interference avoiding circuit 130 is performed.

Furthermore, according to the present embodiment, when transmission packet interference error detecting circuit 120 detects interference, interference avoiding circuit 130 makes a rate setting and retransmission count setting and performs interference avoidance control, and can thereby effectively avoid interference upon receiving an influence of interference waves from an interference source such as a microwave shown in FIG. 6.

(Embodiment 2)

Figure 7:
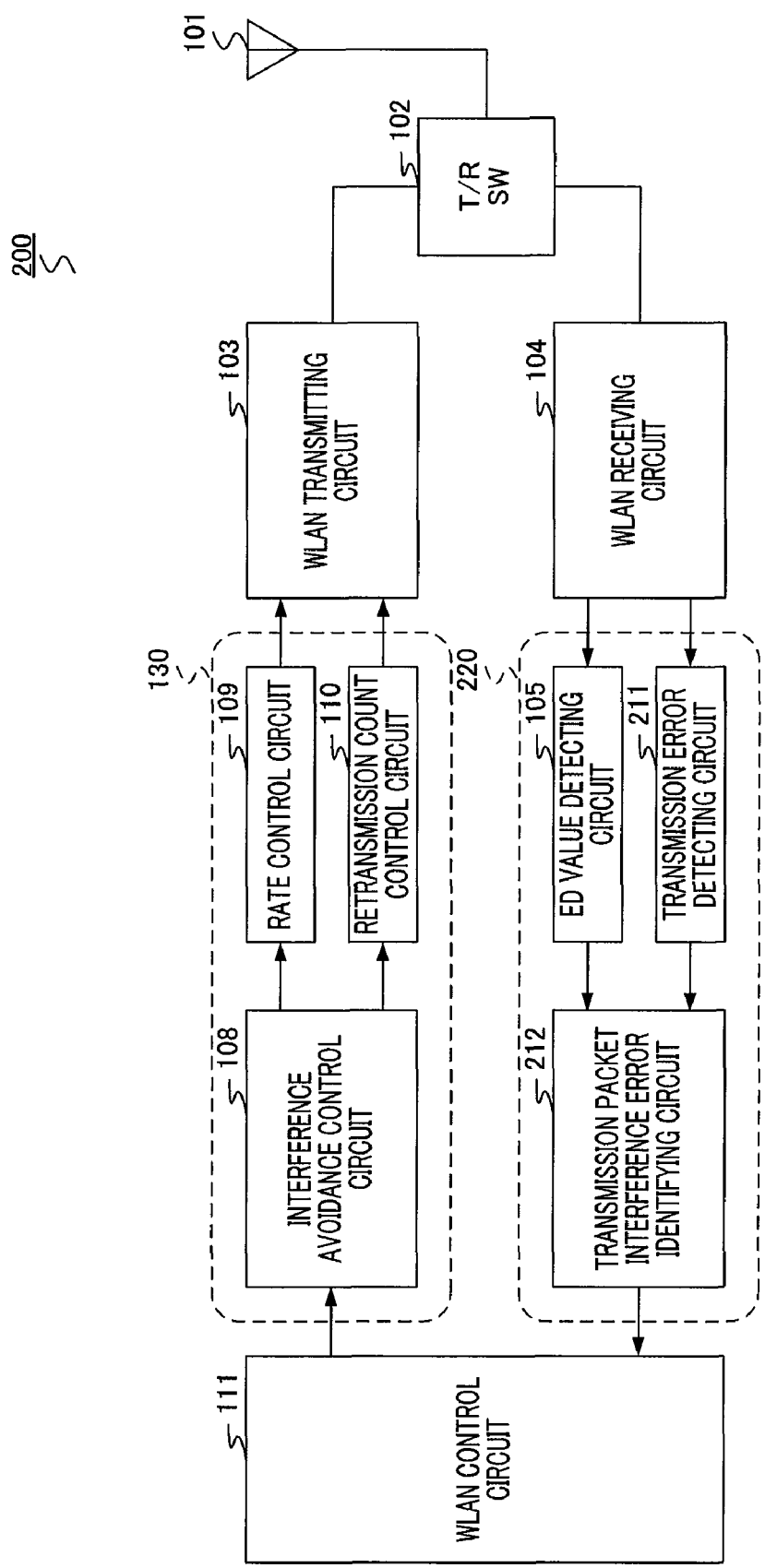
FIG. 7 is a block diagram showing a configuration of a wireless communication apparatus on a WLAN according to Embodiment 2 of the present invention.

FIG. 7 is a block diagram showing a configuration of a wireless communication apparatus on a WLAN according to Embodiment 2 of the present invention. The same components as those in FIG. 5 are assigned the same reference numerals and overlapping explanations will be omitted. The present embodiment is an example of application to a transmission packet interference error detecting method.

In FIG. 7, wireless communication apparatus 200 is constructed by including antenna 101, transmission/reception changeover switch (T/R SW) 102, WLAN transmitting circuit 103, WLAN receiving circuit 104, ED value detecting circuit 105, transmission error detecting circuit 211, transmission packet interference error identifying circuit 212, interference avoidance control circuit 108, rate control circuit 109, retransmission count control circuit 110 and WLAN control circuit 111.

Above-described ED value detecting circuit 105, transmission error detecting circuit 211 and transmission packet interference error identifying circuit 212 as a whole constitute transmission packet interference error detecting circuit 220. Transmission packet interference error detecting circuit 220 is only different in that Ack error detecting circuit 106 and transmission packet interference error identifying circuit 107 of transmission packet interference error detecting circuit 120 in FIG. 5 are replaced by transmission error detecting circuit 211 and transmission packet interference error identifying circuit 212.

Transmission error detecting circuit 211 detects that a transmitted packet has not been successfully transmitted in prescribed retransmissions as a transmission error.

Transmission packet interference error identifying circuit 212 decides that a transmission packet interference error has occurred from the ED value detected in ED value detecting circuit 105 and the transmission error detection result detected by transmission error detecting circuit 211.

Hereinafter, the interference detecting method by the wireless communication apparatus configured as described above will be explained. Embodiment 1 identifies an interference error when a packet transmitted under a condition that the ED value exceeds an interference deciding threshold contains an acknowledgment error. The present embodiment is only different in that the present embodiment identifies an interference error when a packet transmitted under a similar condition has not been successfully transmitted even in a plurality of retransmissions.

Figure 8:
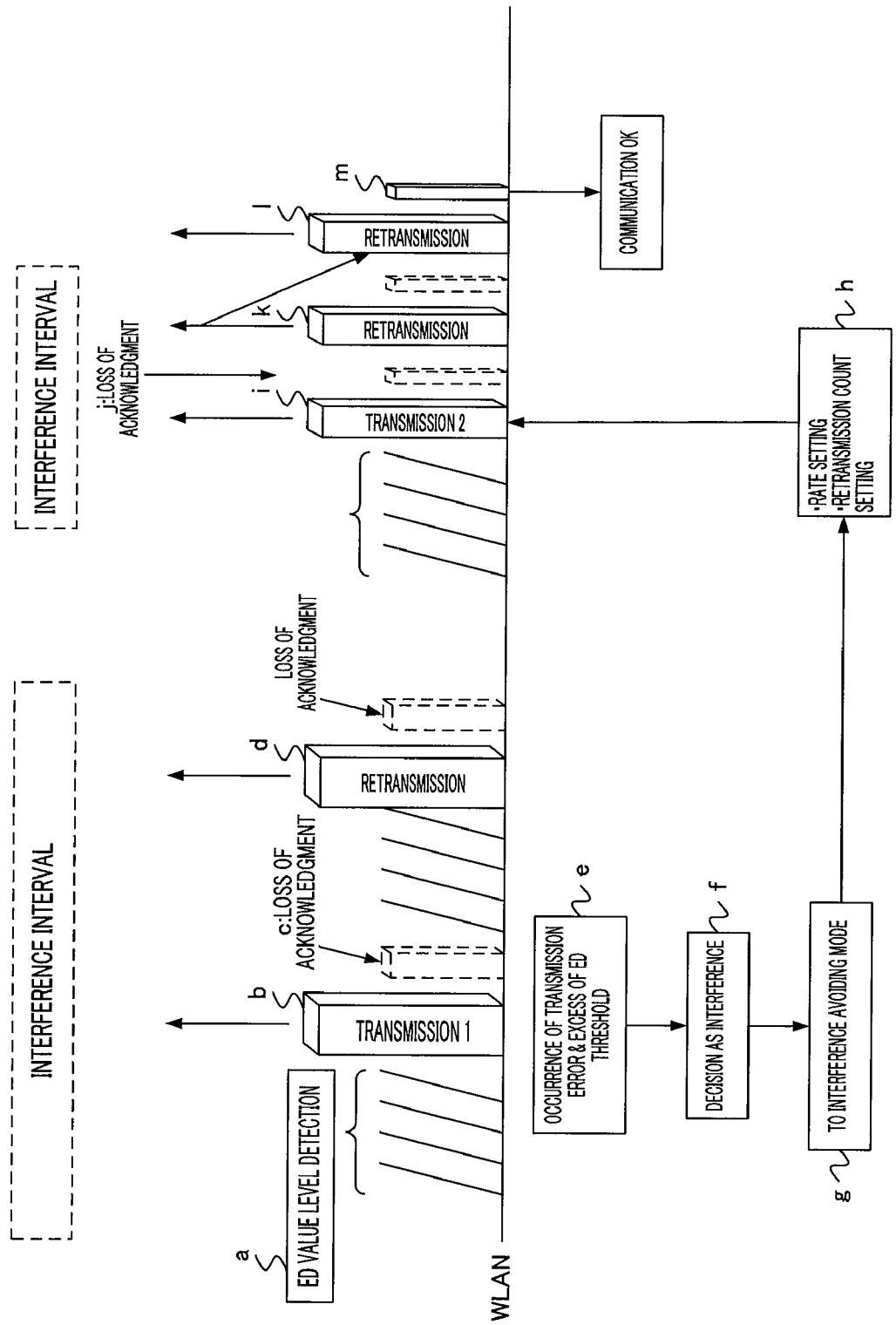
FIG. 8 illustrates a transmission packet interference error detecting method by the transmission packet interference error detecting circuit of the wireless communication apparatus according to the above embodiment.

FIG. 8 illustrates a transmission packet interference error detecting method by transmission packet interference error detecting circuit 220. This interference error detecting method is called a "transmission error decision method."

In normal operation of WLAN, in order to detect whether or not other communication carriers exist before transmitting a transmission packet, an ED value detection and carrier sensing (CS) for detecting the presence of the wireless LAN communication carrier are performed.

First, in transmission packet interference error detecting circuit 220, ED value detecting circuit 105 measures an ED value to be detected before packet transmission and transmission error detecting circuit 211 detects whether or not a packet transmitted under a condition of excess over prescribed interference deciding threshold has been successfully transmitted in prescribed retransmissions. Transmission packet interference error identifying circuit 212 identifies an interference error when the packet transmitted under a condition that the ED value exceeds the interference deciding threshold has not been successfully transmitted even in a plurality of retransmissions.

The transmission packet interference error detecting method will be explained more specifically with reference to FIG. 8.

(1) Before transmitting a packet, ED value detecting circuit 105 measures an ED value to detect the levels of interference waves transmitting in the neighborhood. The measured ED value is compared with a prescribed interference deciding threshold to decide whether or not the ED value exceeds an interference deciding threshold (see FIG. 8a). Next, packet transmission (transmission 1) shown in FIG. 8b is performed and this transmission 1 collides with an interference period during which a microwave is switched on or the like and acknowledgment to the transmitted packet is lost (see FIG. 8c). In response to the loss of acknowledgment, WLAN control circuit 111 makes WLAN transmitting circuit 103 retransmit the relevant packet (see FIG. 8d). This retransmission also collides with the interference period and acknowledgment is lost.

(2) Transmission error detecting circuit 211 detects that the transmitted packet has not been successfully transmitted in prescribed retransmissions as a transmission error. Now, suppose a transmission error and an excess of the ED value over an interference deciding threshold have occurred in FIG. 8e.

(3) Transmission packet interference error identifying circuit 212 detects an error that a packet transmitted under a condition that the ED value detected in (1) above exceeds the interference deciding threshold has not been successfully transmitted even in prescribed retransmissions and transmission has ended (transmission error) (see FIG. 8f). The prior arts detect the level of interference waves and decide that interference has occurred but do not detect whether or not an error has occurred in an environment in which interference waves have occurred.

The present invention has a feature of not only detecting the level of interference waves from the ED value but also deciding whether or not the packet transmitted under a condition that interference waves are produced has not been actually transmitted even in prescribed retransmissions and a transmission error results. Transmission packet interference error detecting circuit 220 of the present embodiment identifies an interference error when a transmission error occurs with a packet transmitted under a condition that the measured ED value exceeds an interference deciding threshold.

When transmission packet interference error detecting circuit 220 identifies an interference error, WLAN control circuit 111 makes interference avoiding circuit 130 execute an interference avoiding mode (see FIG. 8g).

The interference avoidance control by interference avoiding circuit 130 will be described later in Embodiment 4 and Embodiment 5.

To put it simply here, upon detecting interference, interference avoiding circuit 130 performs <rate setting> whereby a transmission rate is set to a prescribed rate and <retransmission count setting> whereby a retransmission count is set (see FIG. 8h).

Based on the interference avoidance control by interference avoiding circuit 130, a rate setting and retransmission count setting are performed and packet transmission (transmission 2) shown in FIG. 8i is carried out according to the rate setting and retransmission count setting. Here, this transmission 2 also collides with an interference period and acknowledgment to the transmitted packet is lost (see FIG. 8j). In response to this loss of acknowledgment, when WLAN control circuit 111 makes WLAN transmitting circuit 103 repeat retransmitting the relevant packet (see FIG. 8k), retransmission succeeds after the interference period is over (see FIG. 8l), acknowledgment is received and communication OK results (see FIG. 8m).

While the above-described acknowledgment error decision method according to Embodiment 1 is a method excelling in responsivity about an interference wave decision, the decision based on a transmission error according to the present embodiment decides that the packet has actually resulted in an error, and is therefore a more reliable method. For example, even if an acknowledgment error occurs, communication may actually continue without errors through retransmissions. Therefore, it is preferable to adaptively select an acknowledgment error decision method that excels in responsivity or a decision method that is based on a transmission error excelling in reliability in an environment in which the WLAN is applied.

(Embodiment 3)

Figure 9:
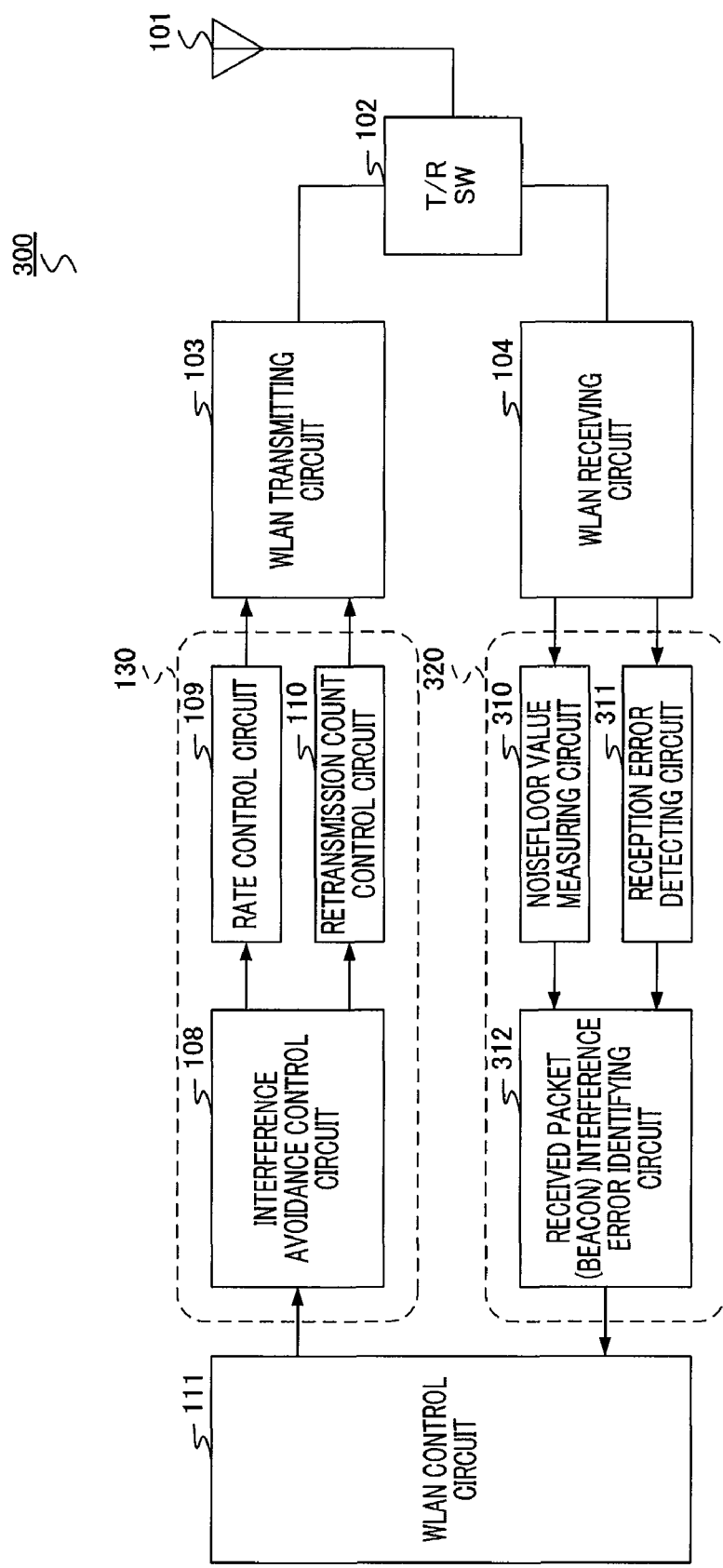
FIG. 9 is a block diagram showing a configuration of a wireless communication apparatus on a WLAN according to Embodiment 3 of the present invention.

FIG. 9 is a block diagram showing a configuration of a wireless communication apparatus on a WLAN according to Embodiment 3 of the present invention. The same components as those in FIG. 5 are assigned the same reference numerals and overlapping explanations will be omitted. The present embodiment is an example of application to a received packet interference error detecting method.

In FIG. 9, wireless communication apparatus 300 is constructed by including antenna 101, transmission/reception changeover switch (T/R SW) 102, WLAN transmitting circuit 103, WLAN receiving circuit 104, noisefloor (interference wave level) value measuring circuit 310, reception error detecting circuit 311, received packet (beacon) interference error identifying circuit 312, interference avoidance control circuit 108, rate control circuit 109, retransmission count control circuit 110 and WLAN control circuit 111.

Above-described noisefloor value measuring circuit 310, reception error detecting circuit 311 and received packet (beacon) interference error identifying circuit 312 as a whole constitute received packet interference error detecting circuit 320. Received packet interference error detecting circuit 320 is used in place of transmission packet interference error detecting circuit 120 in FIG. 5.

Noisefloor (NF) value measuring circuit 310 measures the noisefloor (noise level) measured before and after a received packet. Reception error detecting circuit 311 identifies an error with a received packet (frame check sequence error). Received packet (including also a beacon) interference error identifying circuit 312 decides whether or not the received packet error is an interference error based on the noisefloor (noise level) and information reported from reception error detecting circuit 311.

Hereinafter, the interference detecting method by the wireless communication apparatus configured as described above will be explained.

Embodiments 1 and 2 identify an interference error from a transmission packet. The present embodiment is an interference detecting method that detects an interference error from a received packet and beacon.

Figure 10:
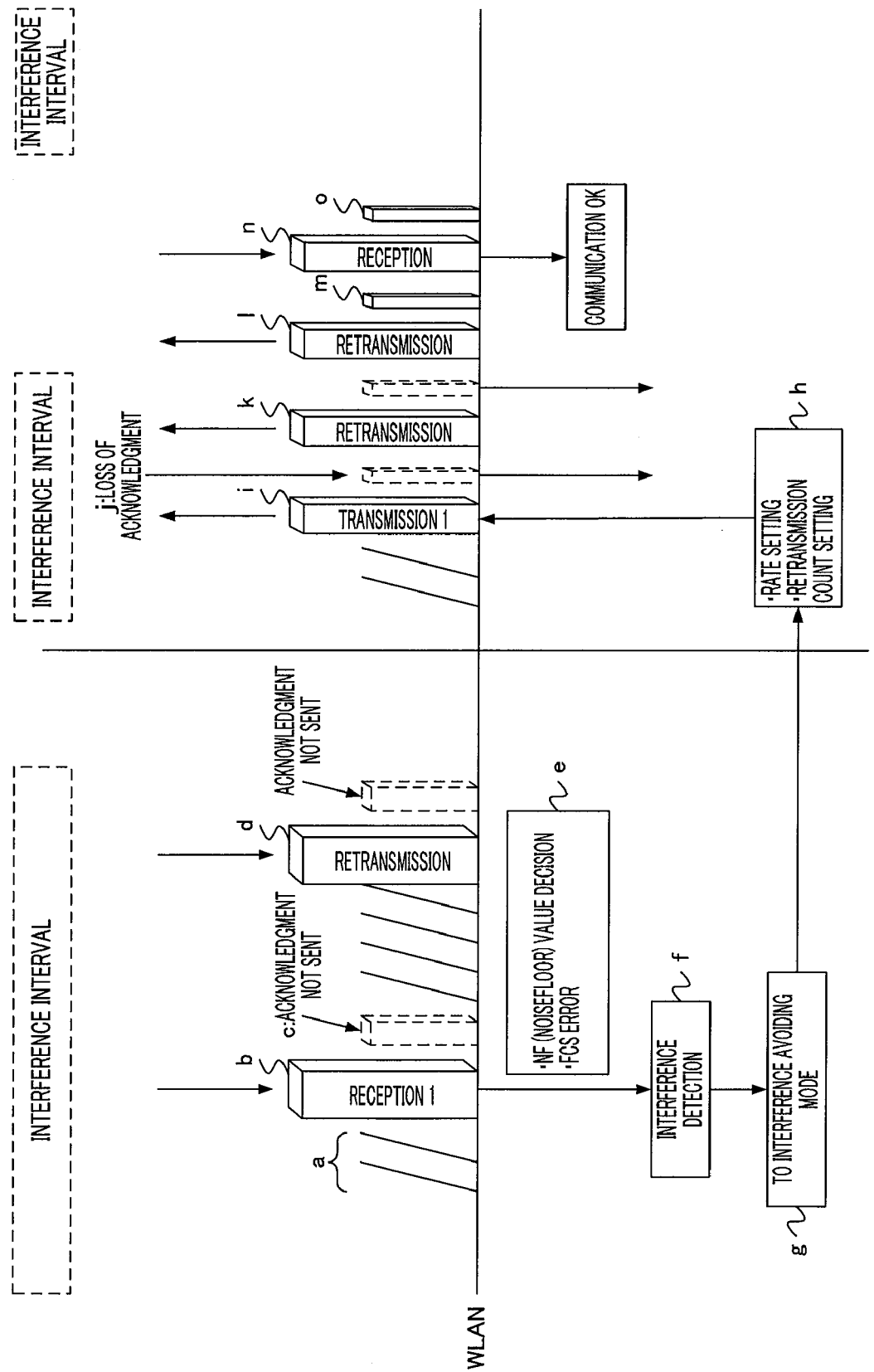
FIG. 10 illustrates a received packet interference error detecting method by the received packet interference error detecting circuit of the wireless communication apparatus according to the above embodiment.

FIG. 10 illustrates a received packet interference error detecting method by received packet interference error detecting circuit 320.

The noisefloor value of when a packet is received is measured and when a packet received in a status exceeding a prescribed interference deciding threshold contains an error, this error is identified a received packet error due to interference.

The received packet interference error detecting method will be explained more specifically with reference to FIG. 10.

(1) Noisefloor value measuring circuit 310 measures the noisefloor measured before and after a received packet. The noisefloor is compared with a prescribed interference deciding threshold to decide whether or not the noisefloor value exceeds the interference deciding threshold (see FIG. 10a). Next, the packet shown in FIG. 10b is received (reception 1), but this reception 1 collides with an interference period during which a microwave is switched on or the like, cannot be received and acknowledgment corresponding to the received packet contains a transmission failure (see FIG. 10c). In response to the acknowledgment transmission failure, WLAN control circuit 111 makes WLAN transmitting circuit 103 retransmit the relevant packet (see FIG. 10d). This retransmission also collides with the interference period and contains an acknowledgment transmission failure.

(2) Received packet interference error detecting circuit 320 decides through reception error detecting circuit 311 that the received packet contains an error (frame check sequence error) at the timing in FIG. 10e apart from the above-described retransmission operation. Now, suppose a noisefloor value has been decided and a frame check sequence error has occurred in FIG. 10e.

(3) Received packet (beacon) interference error identifying circuit 312 decides a received packet error due to interference when the packet received under a condition that the noisefloor value detected in (1) above exceeds an interference deciding threshold contains an error (see FIG. 10f) The prior arts detect the level of interference waves and decide the occurrence of interference, but do not detect whether or not an error has occurred in an environment in which interference waves have occurred.

The present invention has a feature of detecting the interference wave level from the noisefloor value and deciding whether the packet received under a condition that interference waves are produced actually contains an error. Received packet interference error detecting circuit 320 of the present embodiment identifies an interference error when a packet received in a status in which the noisefloor value exceeds an interference deciding threshold contains a frame check sequence error.

When received packet interference error detecting circuit 320 identifies an interference error, WLAN control circuit 111 makes interference avoiding circuit 130 execute an interference avoiding mode (see FIG. 10g).

The interference avoidance control by interference avoiding circuit 130 will be described later in Embodiment 4 and Embodiment 5.

To put it simply here, upon detecting interference, interference avoiding circuit 130 performs <rate setting> for setting the transmission rate to a prescribed rate and <retransmission count setting> for setting a retransmission count (see FIG. 10h).

Rate setting and retransmission count setting are performed based on the interference avoidance control by interference avoiding circuit 130 and packet transmission (transmission 1) shown in FIG. 10i is performed according to this rate setting and retransmission count setting. Here, this transmission 1 also collides with the interference period and acknowledgment for the transmitted packet is lost (see FIG. 10j). In response to this loss of acknowledgment, when WLAN control circuit 111 WLAN transmitting circuit 103 repeat retransmitting the relevant packet (see FIG. 10k), retransmission succeeds after the interference period is over (see FIG. 10l), and if the received packet can also be received (see FIG. 10n) at an interval other than interference after reception of acknowledgment (see FIG. 10m), transmission and mutual communication of received packets are possible (see FIG. 10o).

Thus, according to the present embodiment, wireless communication apparatus 300 is comprised of noisefloor value measuring circuit 310 that measures the noisefloor value of a received packet or beacon, reception error detecting circuit 311 that detects that the received packet contains a frame check sequence error and received packet (beacon) interference error identifying circuit 312, and identifies an interference error when a frame check sequence error is detected from a packet received under a condition that the measured noisefloor value exceeds an interference deciding threshold, and can thereby have effects similar to those in Embodiments 1 and 2, that is, can detect that a communication error has occurred due to occurrence of interference and identify whether or not the communication error generated is attributable to an interference error.

In the present embodiment, the noisefloor value of a received packet is measured, but the noisefloor value of when a beacon is acquired can also be measured and similar effects can be obtained.

Furthermore, a frame check sequence error of a received packet is detected as a reception error, but a reception error other than frame check sequence error or S/N value may also be detected.

(Embodiment 4)

Embodiment 4 and Embodiment 5 will explain interference avoidance control for avoiding interference when the above-described interference detecting method causes interference.

The interference avoiding circuit of the present embodiment is an example of application to an interference avoiding circuit of a wireless communication apparatus on a WLAN. Here, an example of application to interference avoiding circuit 130 of the wireless communication apparatus in FIG. 5, FIG. 7 or FIG. 9 will be explained.

For example, in FIG. 5, to avoid interference when an interference error occurs, interference avoiding circuit 130 is formed with interference avoidance control circuit 108 that controls the transmission rate and the retransmission count, rate control circuit 109 that actually changes the rate upon request from interference avoidance control circuit 108 and retransmission count control circuit 110 that changes the retransmission count upon request from interference avoidance control circuit 108.

Hereinafter, the interference avoidance method of the wireless communication apparatus configured as described above will be explained.

Figure 4:
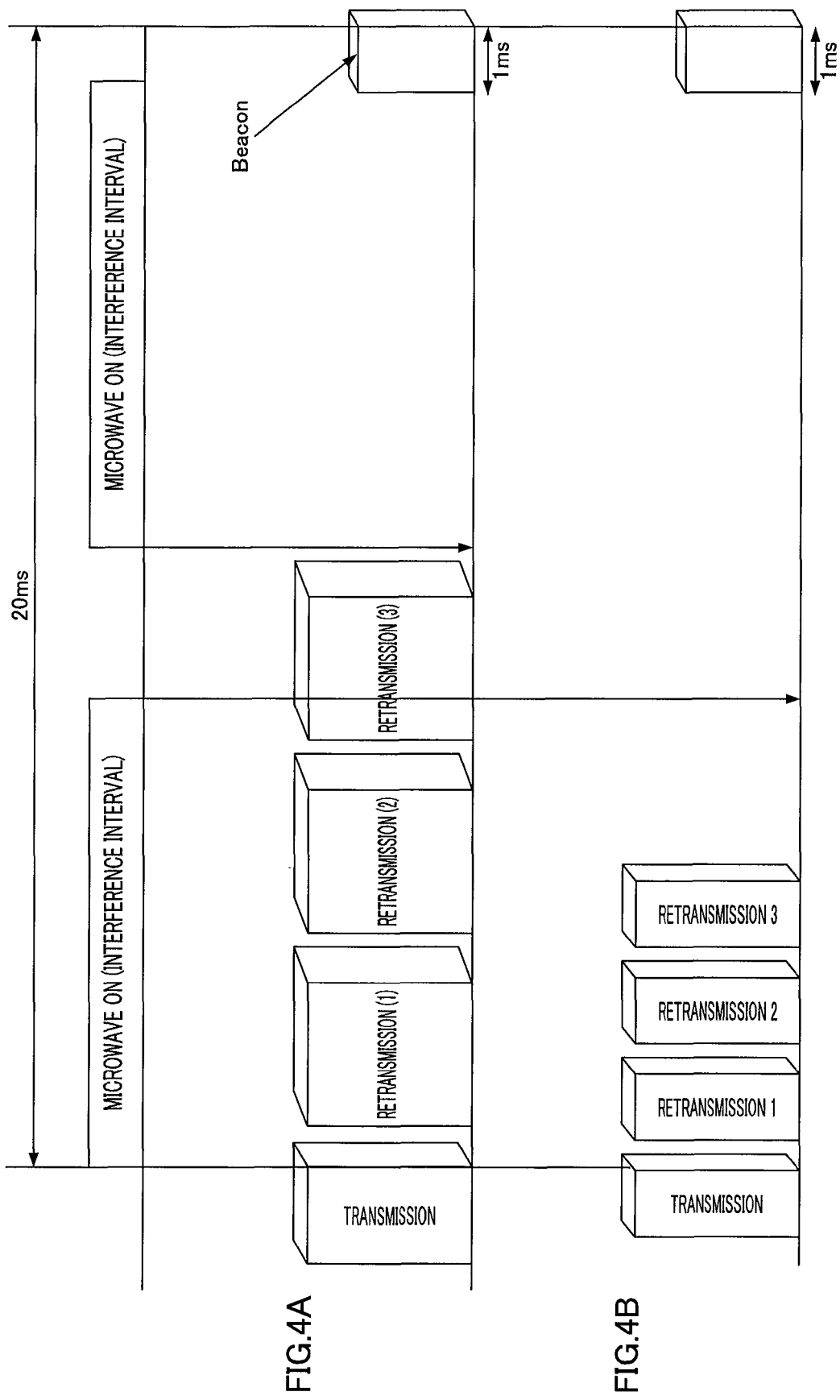
FIG. 4 shows the relationships between interference waves and the number of packet retransmissions.

When a microwave is turned on in a frequency band of a communication carrier through which the wireless communication apparatus is carrying out transmission and reception, this microwave becomes an interference wave source and the period in which the microwave is switched on becomes the interference period. In the conventional example as shown in FIG. 4A, when interference occurs during transmission, the transmission rate is consequently reduced through fallback and retransmission is consequently realized with an extended packet length, and as shown in FIG. 4B, the number of retransmissions is a small predetermined number. For this reason, as the transmission rate is reduced through fallback, the packet length is increased, and therefore the retransmitted packet cannot pass through the gap between "ON" periods (i.e. interference period) of the microwave and furthermore since the number of retransmissions is a small predetermined number, retransmissions beyond the "ON" period (i.e. interference period) of the microwave cannot be realized.

Therefore, the present embodiment (1) stops fallback control upon detection of interference and fixes the transmission rate to a certain rate and (2) sets, upon detection of interference, a greater retransmission count than during normal communication.

Figure 11:
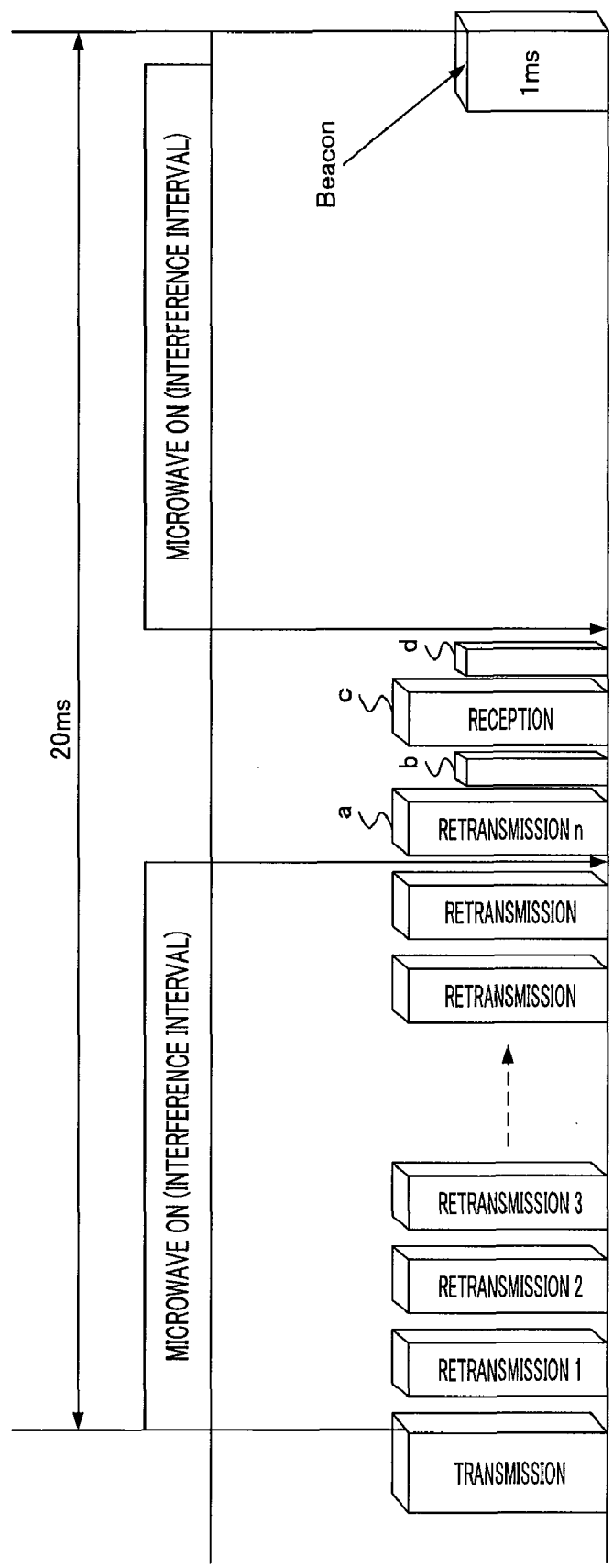
FIG. 11 shows a relationship between an interference wave and the number of packet retransmissions according to the interference avoiding circuit of the wireless communication apparatus according to the above embodiment.

FIG. 11 shows a relationship between an interference wave and the number of packet retransmissions according to interference avoiding circuit 130 of the wireless communication apparatus of the present embodiment. A case where a microwave is turned on (i.e. interference period) intermittently for a period of 20 msec will be taken as an example. Furthermore, a beacon has a packet length of about 1 msec.

(1) Fixing of Transmission Rate

When interference error detecting circuit 120, 220 or 320 detects interference (see FIG. 5, FIG. 7, FIG. 9f), interference avoiding circuit 130 moves to <interference avoiding mode> (see FIG. 5, FIG. 7, FIG. 9g) and interference avoidance control circuit 108 stops the fallback control on rate control circuit 109 and sets the transmission rate to a prescribed rate. For example, as shown in FIG. 11, the transmission rate is fixed to such a rate that interference can be avoided between an "ON" period (i.e. interference period) of the microwave and the next "ON" period (i.e. interference period) of the microwave. Rate control circuit 109 stops fallback control, fixes the transmission rate to a certain rate and thereby performs retransmission without increasing the packet length. This makes it possible to control the packet length to one estimated beforehand at the time of interference avoidance and thereby pass through the gap between the "ON" periods (i.e. interference period) of the microwave as in the case of retransmission n in FIG. 11a and reception in FIG. 11c. FIG. 11b is acknowledgment for retransmission n and FIG. 11d is acknowledgment for reception.

(2) Setting of Retransmission Count

Furthermore, interference avoidance control circuit 108 sets a greater retransmission count in retransmission count control circuit 110 than during normal operation. For example, the retransmission count in normal operation is of about three to seven, but when interference is detected, the retransmission count is set to ten or more. As shown in retransmission n in FIG. 11a, retransmission is carried out at a retransmission count that exceeds the "ON" period (i.e. interference period) of the microwave and communication thereby succeeds.

The interference avoidance control described so far will be explained in further detail.

Figure 12:
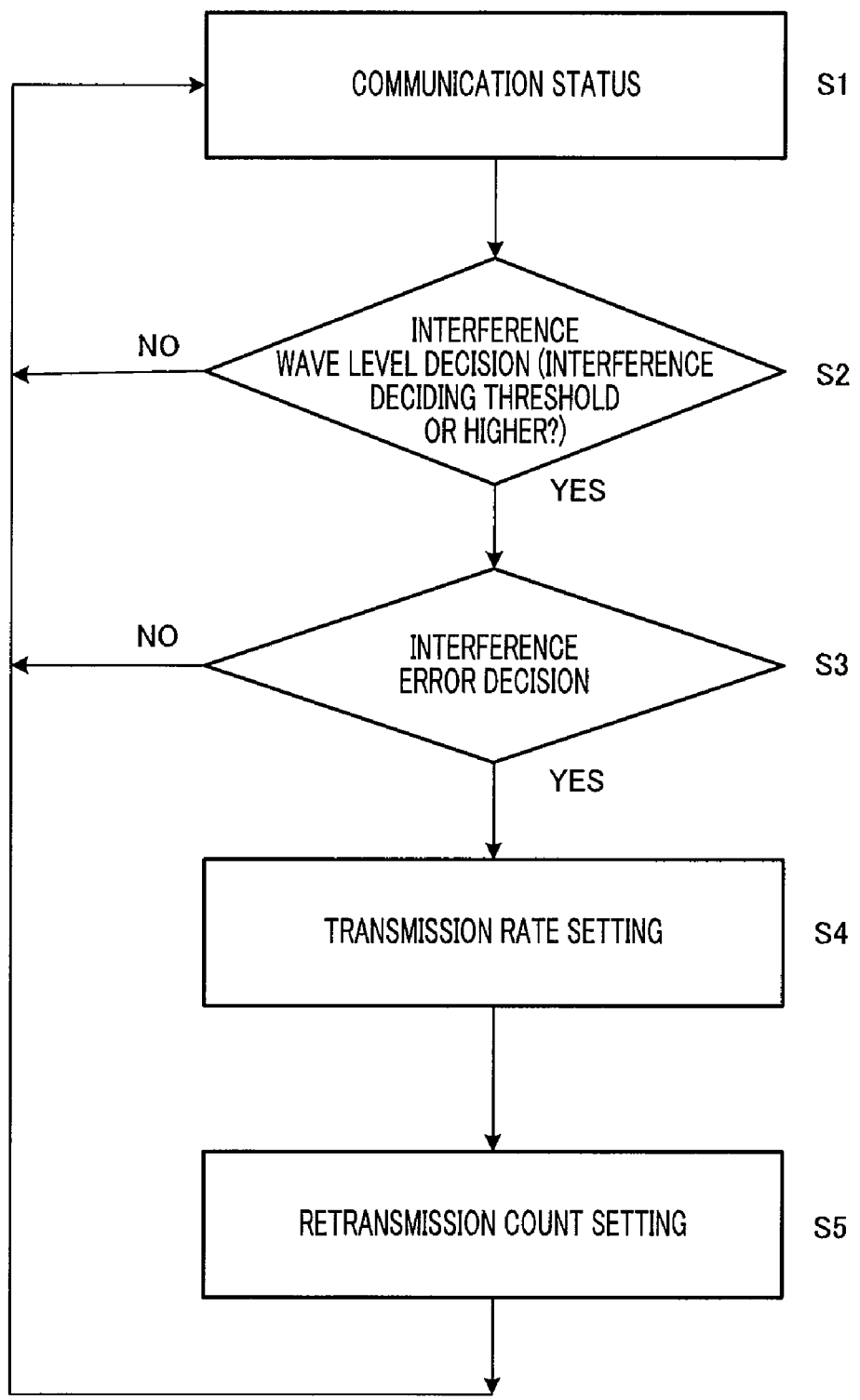
FIG. 12 is a flowchart showing interference avoidance processing by the interference error avoiding circuit of the wireless communication apparatus according to the above embodiment.
Figure 13:
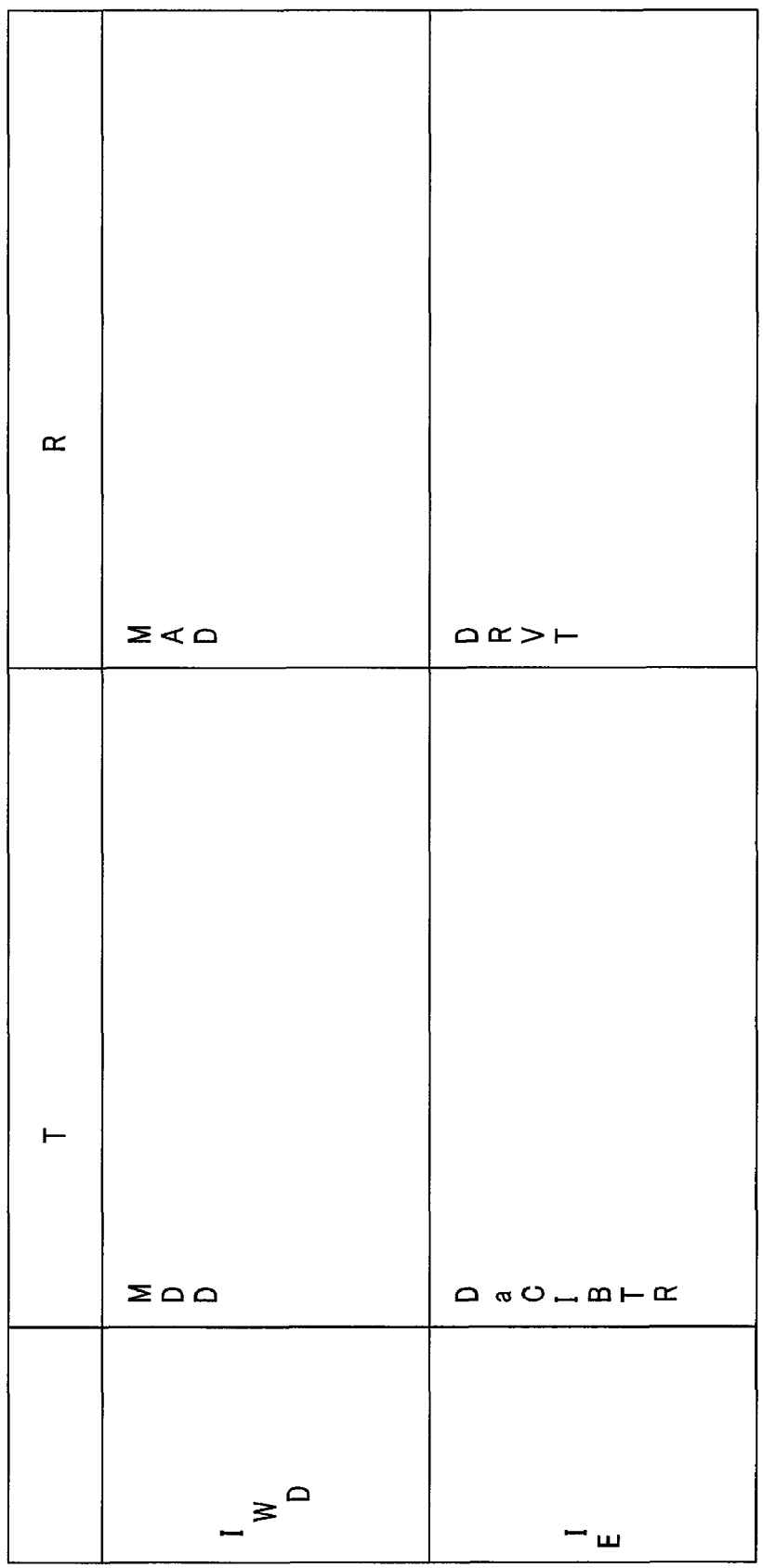
FIG. 13 shows a table of operation contents of an interference wave level decision and interference error decision by the wireless communication apparatus according to the above embodiment.

FIG. 12 is a flowchart showing interference avoidance processing by interference error avoiding circuit 130. "S" in the figure stands for each step in the flow. FIG. 13 is a table of operation contents of an interference wave level decision and interference error decision.

First, in step S1, interference error detecting circuit 120, 220, 320 is monitoring a communication status and decides the interference wave level in step S2. As for an interference wave level decision, when a [transmission packet] is used as shown in the table in FIG. 13, the ED value before transmission is measured to decide whether or not the measured ED value exceeds an interference deciding threshold (see Embodiments 1 and 2). When a [received packet] is used, the noisefloor value at the time of reception is measured to decide whether or not the measured noisefloor value exceeds the interference deciding threshold (see Embodiment 3). When the above-described ED value or noisefloor value is less than the interference deciding threshold, no interference wave has occurred, and therefore the process does not move to the interference avoidance operation, but the process returns to step S1 above to continue the normal communication status.

When the ED value or noisefloor value exceeds an interference deciding threshold in step S2 above, an interference error decision is made in step S3. As shown in the table in FIG. 13, when the [transmission packet] is used, an interference error is identified when acknowledgment from the AP to the packet transmitted under a condition that the ED value exceeds the interference deciding threshold is lost (see Embodiment 1). Alternatively, an interference error is identified when the packet transmitted under a condition that the ED value exceeds the interference deciding threshold has not been successfully transmitted in prescribed retransmissions (see Embodiment 2). When the [received packet] is used, an interference error is identified when an error is found in the packet received under a condition that the noisefloor value exceeds the interference deciding threshold. In this way, an interference error is identified when an error is found in a packet transmitted or received in an environment in which the interference wave level is such a large level that exceeds a prescribed interference deciding threshold.

When the ED value or noisefloor value exceeds the interference deciding threshold but no error has occurred in step S3 above, there is no need to perform this interference avoidance, and therefore the normal communication status is maintained. When an interference error is identified in step S3 above, the transmission rate is set to a prescribed fixed rate so that communication is possible in the gap between the interference sources (e.g., "ON" periods of microwave) in step S4 and a retransmission count that increases the retransmission count compared to the count for during normal communication is set in step S5 and this flow is finished. In the above transmission rate setting, rate control circuit 109 stops fallback control and sets the transmission rate to a prescribed transmission rate. Furthermore, in the above-described retransmission count setting, retransmission count control circuit 110 sets a greater retransmission count than during normal operation. For example, a retransmission count of about three to seven in normal communication is increased to ten or so.

Through the above-described interference avoidance operation, fallback control is stopped, the rate is set so that the packet length is fixed and more retransmissions are carried out, and retransmission prescribed so as to have an appropriate packet size for the gap between interference waves upon detection of an interference error is thereby carried out a greater number of times than normal retransmission, the hit rate of passing the gap between interference sources improves and the effect of passing the gap between the interference sources and making communication possible are anticipated.

In this way, the present embodiment is provided with interference avoiding circuit 130 comprised of interference avoidance control circuit 108, rate control circuit 109 and retransmission count control circuit 110 and interference avoiding circuit 130 stops, upon detection of an interference error, fallback control that reduces the transmission rate, fixes the transmission rate to a certain rate and sets a greater retransmission count than during normal communication, and therefore communication is made possible in the gap between interference sources while carrying out retransmission with a certain fixed packet length, and it is possible to avoid interference upon receiving influences of interference waves due to interference sources such as a microwave during WLAN communication and carry out communication.

(Embodiment 5)

Embodiment 4 stops fallback control upon detecting interference, fixes the transmission rate to a certain rate, sets a greater retransmission count than during normal communication, and can thereby perform interference avoidance in the gap between interference sources. The present embodiment is an example where a transmission rate and a retransmission count at the time of above-described interference avoidance are set according to the size of data transmitted.

Figure 14:
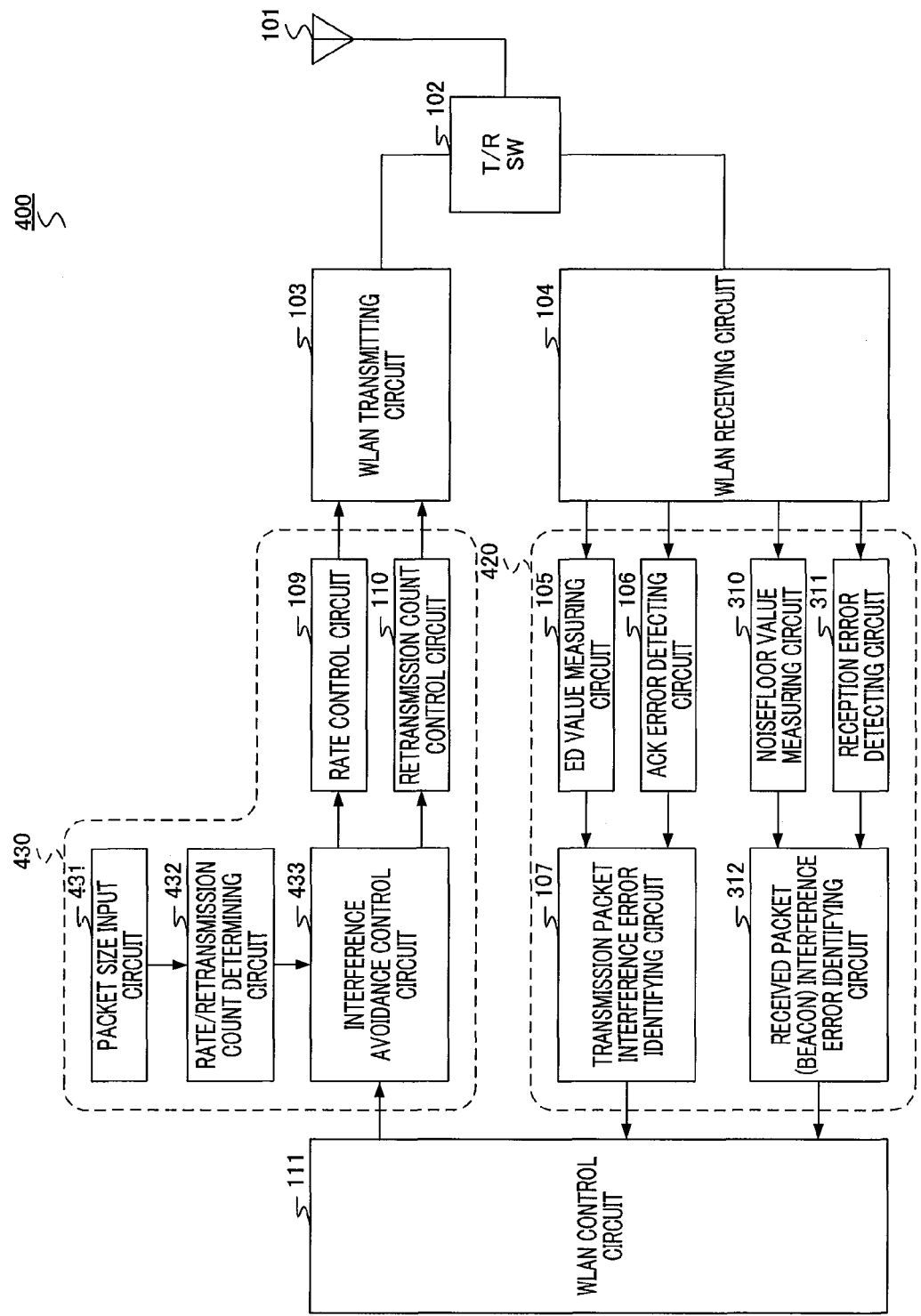
FIG. 14 is a block diagram showing a configuration of a wireless communication apparatus on a WLAN according to Embodiment 5 of the present invention.

FIG. 14 is a block diagram showing a configuration of a wireless communication apparatus on a WLAN according to Embodiment 5 of the present invention. The same components as those in FIG. 5 and FIG. 9 are assigned the same reference numerals and overlapping explanations will be omitted. The present embodiment is an example of application to an interference error detecting method for a transmission packet and a received packet.

In FIG. 14, wireless communication apparatus 400 is constructed by including antenna 101, transmission/reception changeover switch (T/R SW) 102, WLAN transmitting circuit 103, WLAN receiving circuit 104, ED value detecting circuit 105, Ack error detecting circuit 106, transmission packet interference error identifying circuit 107, noisefloor (interference wave level) value measuring circuit 310, reception error detecting circuit 311, received packet (beacon) interference error identifying circuit 312, packet size input circuit 431, rate/retransmission count determining circuit 432, interference avoidance control circuit 433, rate control circuit 109, retransmission count control circuit 110 and WLAN control circuit 111.

Above-described ED value detecting circuit 105, Ack error detecting circuit 106, transmission packet interference error identifying circuit 107, noisefloor value measuring circuit 310, reception error detecting circuit 311 and received packet interference error identifying circuit 312 as a whole constitute packet interference error detecting circuit 420 and above-described packet size input circuit 431, rate/retransmission count determining circuit 432, interference avoidance control circuit 433, rate control circuit 109 and retransmission count control circuit 110 as a whole constitute interference avoiding circuit 430.

Packet interference error detecting circuit 420 has a configuration including both transmission packet interference error detecting circuit 120 in FIG. 5 and received packet interference error detecting circuit 320 in FIG. 9.

Interference avoiding circuit 430 is different in that packet size input circuit 431 and rate/retransmission count determining circuit 432 are added to interference avoiding circuit 130 in FIG. 5 and interference avoidance control circuit 433 has additional control of setting a transmission rate and a retransmission count according to the size of data transmitted.

Packet size input circuit 431 inputs the size of a packet to be transmitted to rate/retransmission count determining circuit 432.

Rate/retransmission count determining circuit 432 determines a rate/retransmission count from the inputted packet according to a prescribed table.

Figure 15:
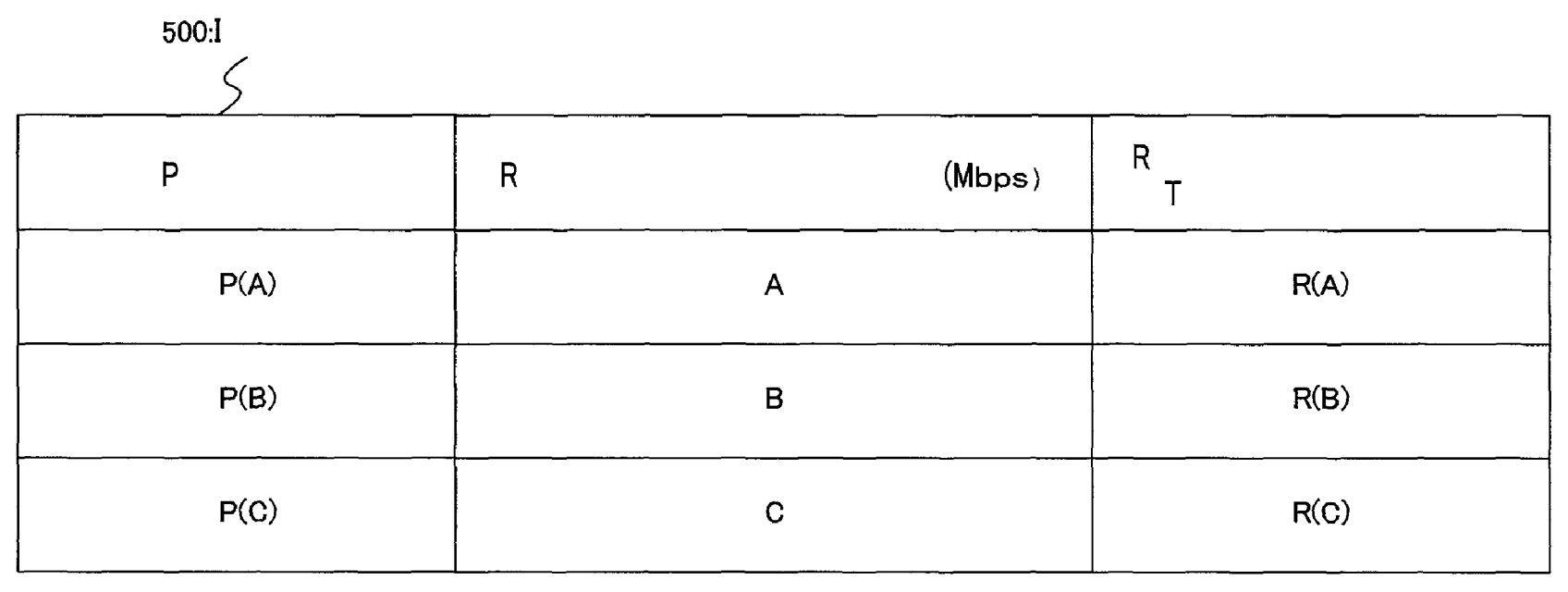

FIG. 15 shows an example of an interference avoidance table referred to by rate/retransmission count determining circuit 432.

In FIG. 15, interference avoidance setting table 500 stores transmission rates A, B, C . . . [Mbps] in packet sizes P(A), P(B), P(C), . . . and retransmission counts R(A), R(B), R(C), . . . beforehand as table values. When, for example, the size of data to be transmitted (packet size) P(A) is inputted, the transmission rate and retransmission count corresponding to this packet size P(A) is referred to and transmission rate A [Mbps] and retransmission count R(A) are read in this case.

Hereinafter, the interference avoidance method for the wireless communication apparatus configured as described above will be explained.

FIGS. 16A and B show a relationship between an interference wave and the number of packet retransmissions according to interference avoiding circuit 430 of the wireless communication apparatus of the present embodiment. A case where a microwave is turned on (i.e. interference period) intermittently for a period of 20 msec will be taken as an example. Furthermore, a beacon has a packet length of about 1 msec.

The present embodiment sets the transmission rate and retransmission count at the time of interference avoidance according to the size of data to be transmitted. The basic operations after the settings of the transmission rate and retransmission count are similar to those in Embodiment 4.

(1) Input of size of data to be transmitted

When interference error detecting circuit 420 detects interference, interference avoiding circuit 430 moves to <interference avoiding mode>.

Packet size input circuit 431 of interference avoiding circuit 430 inputs the size of a packet to be transmitted to rate/retransmission count determining circuit 432.

(2) Determination of Transmission Rate/Retransmission Count

Rate/retransmission count determining circuit 432 refers to interference avoidance setting table 500 and reads transmission rates A, B, C . . . [Mbps] and retransmission counts R(A), R(B), R(C), . . . corresponding to the inputted size of the packet transmitted. FIG. 16A shows a case where a size of data to be transmitted (packet size) P(A) is inputted, transmission rate A [Mbps] and retransmission count R(A) corresponding to the packet size P(A) are read and set and FIG. 16B shows a case where the size of data to be transmitted (packet size) P(C) is inputted, transmission rate C [Mbps] and retransmission count R(C) corresponding to packet size P(C) are read and set.

(3) Setting of Transmission Rate

Figure 16:
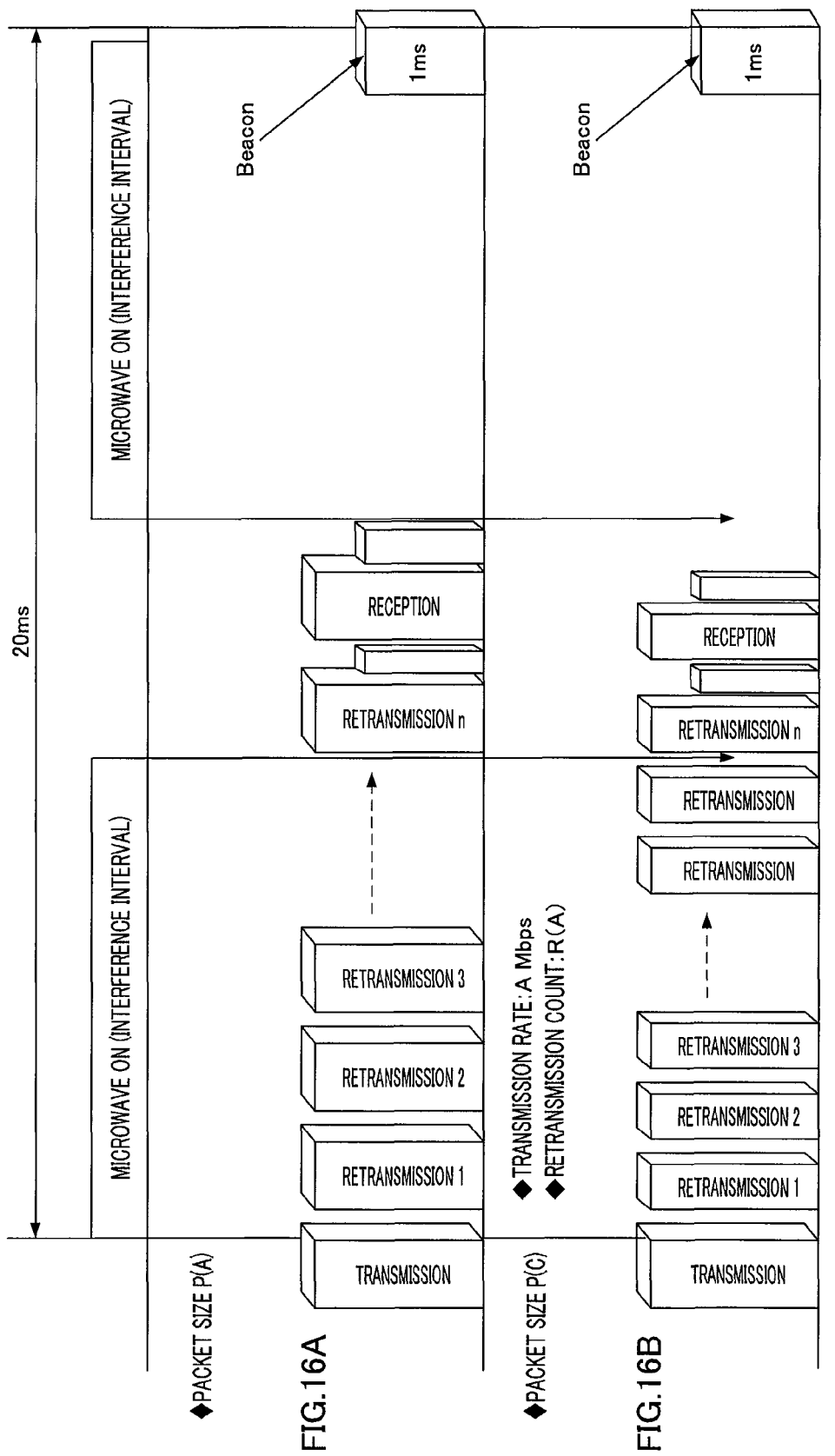
FIG. 16 shows a relationship between an interference wave and the number of packet retransmissions according to the interference avoiding circuit of the wireless communication apparatus according to the above embodiment.

Interference avoidance control circuit 433 stops fallback control on rate control circuit 109 and fixes the transmission rate to a rate set by rate/retransmission count determining circuit 432. For example, as shown in FIG. 16A, in response to transmission packet size P(A) generated, the transmission rate is fixed to transmission rate A [Mbps] so as to be able to avoid interference in the gap between an "ON" period (i.e. interference period) of a microwave and the next "ON" period (i.e. interference period) of the microwave. In the present embodiment, the transmission rate set by rate control circuit 109 is made variable according to the size of data to be transmitted. For example, as shown in FIG. 16B, when the size of data to be transmitted generated is packet size P(C), the packet in this transmission data size can be transmitted and transmission rate O [Mbps] is set so as to be able to avoid interference in the gap between an "ON" period (i.e. interference period) of a microwave and the next "ON" period (i.e. interference period) of the microwave. In FIG. 16, transmission rate A [Mbps] and transmission rate C [Mbps] of retransmission and reception vary according to packet size P(A) and packet size P(C), but a packet length is set to such a length that makes communication possible in the gap between "ON" periods (i.e. interference period) of the microwave, and in this way, the transmission packet and retransmission packet lengths become packet sizes that allow interference avoidance corresponding to the transmission data size and repeating the retransmission in FIG. 16A, (b) makes it possible to pass through the gap between "ON" periods (i.e. interference period) of the microwave.

(4) Setting of Retransmission Count

Furthermore, interference avoidance control circuit 433 sets the retransmission count determined by rate/retransmission count determining circuit 432 in retransmission count control circuit 110. The basic value itself of the retransmission count determined by rate/retransmission count determining circuit 432 is a greater retransmission count than during normal operation and a retransmission count adjusted according to the transmission data size is set therein. In FIG. 16, retransmission count R(A) and retransmission count R(C) are set according to packet size P(A) and packet size P(C) respectively. In a normal operation, the retransmission count is of about three to seven, but when interference is detected, retransmission counts R (A) and R(C) of at least ten or so are set. In this way, as shown by retransmission n in FIG. 16A, (b), retransmission is repeated so as to exceed the "ON" period (i.e. interference period) of the microwave, and communication by retransmission thereby succeeds.

The above-described interference avoidance control will be explained in further detail.

Figure 17:
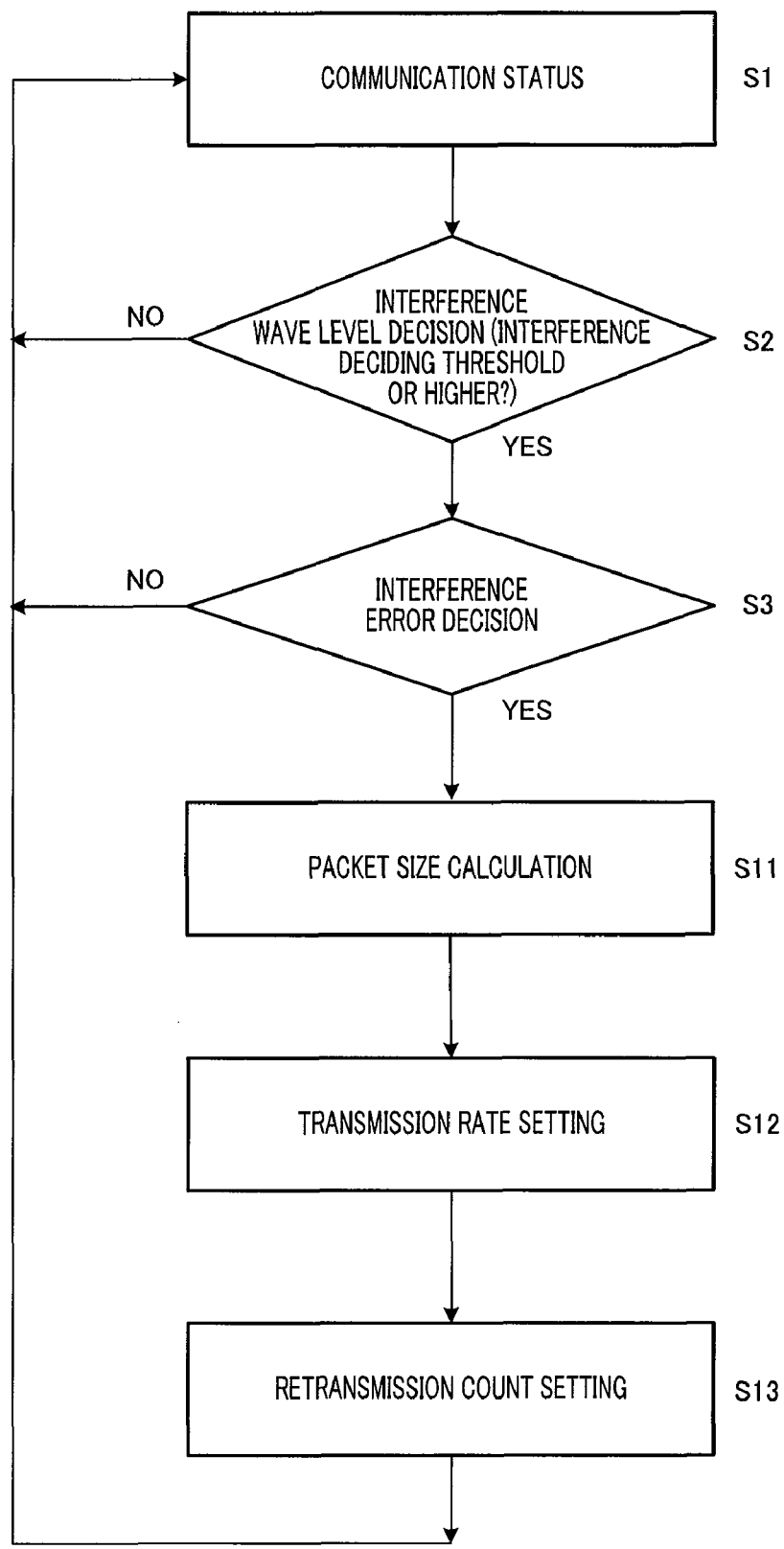
FIG. 17 is a flowchart showing interference avoidance processing by the interference error avoiding circuit of the wireless communication apparatus according to the above embodiment.

FIG. 17 is a flowchart showing interference avoidance processing by interference error avoiding circuit 430. Steps of performing the same processing as that in the flow in FIG. 12 are assigned the same reference numerals.

First, in step S1, interference error detecting circuit 420 is monitoring a communication status and decides the interference wave level in step S2. In an interference wave level decision, when a [transmission packet] is used as shown in the table in FIG. 13, the ED value before transmitting is measured to decide whether or not the measured ED value exceeds an interference deciding threshold. When a [received packet] is used, the noisefloor value at the time of reception is measured to decide whether or not the measured noisefloor value exceeds the interference deciding threshold. When the above-described ED value or NF value is less than the interference deciding threshold, the level of interference waves is low and it is therefore decided that no interference wave has occurred and the process returns to step S1 above.

When the ED value or noisefloor value in step S2 above exceeds the interference deciding threshold, an interference error decision is made in step S3. As for the interference wave error decision, when the [transmission packet] is used as shown in the table in FIG. 13, an interference error is identified when acknowledgment from the AP to the packet transmitted under a condition that the ED value exceeds an interference deciding threshold is lost. Alternatively, an interference error is identified when a packet transmitted under a condition that the ED value exceeds an interference deciding threshold has not been successfully transmitted in prescribed retransmissions. When the [received packet] is used, an interference error is identified when a packet received under a condition that the noisefloor value exceeds an interference deciding threshold contains an error. In this way, an interference error is identified when a packet transmitted or received under a condition that interference waves are produced contains an error.

In step S3 above, when it is decided that the ED value or noisefloor value exceeds the interference deciding threshold but no interference error results, communication can be continued even when interference waves are produced, and therefore a normal communication status is maintained.

When an interference error is identified in step S3 above, the packet size is calculated in step S11. The size of transmission data generated is inputted from packet size input circuit 431 and the packet size is calculated from this packet size. Next, in step S12, a transmission rate is set according to the calculated packet size with reference to prescribed interference avoidance setting table 500, and in step S13, a retransmission count is set with reference to interference avoidance setting table 500 and this flow is finished. The transmission rate set with reference to interference avoidance setting table 500 is a prescribed fixed transmission rate so as to be communicable through the gap between interference sources (e.g., microwave that is turned on). The retransmission count set with reference to interference avoidance setting table 500 is a greater retransmission count than during normal operation.

Through the above-described interference avoidance operation, fallback control is stopped, a rate setting is made so as to fix the packet length, retransmission is performed a greater number of times, and when an interference error is detected, retransmission of a packet of a size prescribed for interference avoidance is performed a greater number of times than normal retransmission, and the hit rate of passing the gap between interference sources thereby improves and the effect of passing the gap between interference sources and making communication possible are anticipated.

In this way, the present embodiment sets the transmission rate and retransmission count according to the size of a packet to be transmitted, and therefore when retransmission is performed with a certain packet length, an appropriate transmission rate and retransmission count can be set, and during WLAN communication when influences of interference waves from an interference source such as a microwave are received, the effect of further increasing the effectiveness of interference avoidance are anticipated.

Here, the present embodiment sets the transmission rate and retransmission count according to prescribed interference avoidance setting table 500 according to the size of a packet to be transmitted, but any method can be adopted as long as a transmission rate or retransmission count is set according to the size of data to be transmitted. For example, in transmission rate setting, it is also possible to use the method of calculating a transmission rate so as to obtain a certain packet length from the size of a packet to be transmitted without having any table. Alternatively, it is also possible to use the method of setting a packet length at the time of interference avoidance beforehand and automatically calculating a transmission rate to achieve the packet length from the size of transmission data generated. Furthermore, it is also possible to use the method of detecting the period of a gap between interference waves for a certain period of time and calculating a transmission rate and retransmission count that allow communication during the gap period.

The explanations given so far illustrate the preferred embodiments of the present invention and the scope of the present invention is by no means limited to this. For example, specific interference sources not belonging to a wireless LAN system such as a microwave have been explained, but the interference source can be anything and the present invention is applicable to all interfering devices that have influences inside and outside the wireless LAN system.

The above-described embodiments use the terms such as "wireless communication apparatus," "wireless LAN system," "interference detecting method" and "interference avoidance method" but these terms are used for convenience of explanation and it goes without saying that the terms can also be "mobile terminal," "wireless communication device," "wireless communication control method" and "jamming elimination method" or the like.

The type, the number and connection method of the respective circuit sections making up the above-described wireless communication apparatus are not limited to the aforementioned embodiments.

Furthermore, the interference detecting method and interference avoidance method explained above can also be implemented by a program to cause this interference detecting method and interference avoidance method to function. This program is stored in a computer-readable recording medium.

The wireless communication apparatus according to the present invention adopts a configuration including: a communication status deciding section that decides a wireless communication status; a packet error detecting section that detects an error with a transmitted or received packet; and an interference error deciding section that decides, when the wireless communication status decided in the communication status deciding section shows a predetermined interference decision condition, an interference error from an interference source when an error is detected in the packet error detecting section.

The communication status deciding section may measure the ED value before packet transmission and the communication status deciding section may measure the level of interference waves before packet transmission.

The communication status deciding section may measure the noisefloor value of when a packet is received and the communication status deciding section may measure the noisefloor value of when a beacon is received and further the communication status deciding section may measure an S/N when a received packet is acquired.

The packet error detecting section may detect an acknowledgment error with respect to a transmitted packet, the packet error detecting section may detect that a transmitted packet cannot be retransmitted in a predetermined number of retransmissions, and further the packet error detecting section may detect that a received packet contains a frame check sequence error.

The wireless communication apparatus of the present invention is a wireless communication apparatus that performs fallback control to reduce transmission rate when a communication error occurs and adopts a configuration including an interference avoidance control section that stops, when an interference error is detected, the fallback control, fixes the transmission rate to a certain rate and increases the number of retransmissions compared to the count for during normal communication.

The wireless communication apparatus of the present invention is a wireless communication apparatus that performs rate control that increases a transmission rate when a communication error is corrected, and adopts a configuration including an interference avoidance control section that stops, when an interference error is detected, fallback control, fixes a transmission rate to a certain rate and increases the number of retransmissions compared to the count for during normal communication.

The interference avoidance control section may set the transmission rate in a packet size to pass the gap between interference periods from a specific interference source, the interference avoidance control section may set the retransmission count to reach the gap between interference periods from a specific interference source and further the interference avoidance control section may set the transmission rate and/or the retransmission count according to the size of a packet transmitted.

The wireless communication apparatus of the present invention further includes an interference detecting section that detects interference errors, and this interference detecting section has: a communication status deciding section that decides a wireless communication status; a packet error detecting section that detects an error with a transmitted or received packet; and an interference error deciding section that decides, when the wireless communication status decided in the communication status deciding section shows a predetermined interference decision condition, an interference error from an interference source when an error is detected in the packet error detecting section.

The wireless LAN system of the present invention is a wireless LAN system that connects a plurality of wireless communication apparatuses via a wireless network and adopts a configuration in which the wireless communication apparatuses are each one of the wireless communication apparatuses described above.

The interference detecting method of the present invention includes the steps of: measuring an energy detect value before packet transmission; detecting an acknowledgment error with respect to a transmitted packet; and identifying an interference error when the acknowledgment error is detected with respect to the packet transmitted under a condition that the measured energy detect value exceeds an interference deciding threshold.

The interference detecting method of the present invention includes the steps of: measuring an energy detect value before packet transmission; detecting a transmission error that a transmitted packet cannot be retransmitted in a predetermined number of retransmissions; and identifying an interference error when the transmission error is detected from the packet transmitted under a condition that the measured energy detect value exceeds an interference deciding threshold.

The interference detecting method of the present invention includes the steps of: measuring the noisefloor value of when a packet is received; detecting a reception error with the received packet including a frame check sequence error; and identifying an interference error when the reception error is detected from the packet received under a condition that the measured noisefloor value exceeds an interference deciding threshold.

The interference detecting method of the present invention includes: measuring the noisefloor value of when a beacon is received; detecting a reception error with a received packet including a frame check sequence error; and identifying an interference error when the reception error is detected with the packet received under a condition that the measured noisefloor value exceeds an interference deciding threshold.

The interference avoidance method of the present invention includes the steps of: stopping, when an interference error is detected, fallback control to reduce transmission rate and fixing the transmission rate to a certain rate; and increasing the number of retransmissions compared to the count for during normal communication.

In the transmission rate step, the transmission rate in a packet size to pass the gap between interference periods from a specific interference source may be set for the gap.

In the retransmission count step, the retransmission count that reaches a gap between interference periods from a specific interference source may be set for the gap.

In the transmission rate step, the transmission rate may be set according to the size of a packet transmitted and in the retransmission count step, the retransmission count may be set according to the size of a packet transmitted.

The interference avoidance method of the present invention further includes a step of detecting interference errors, the interference error detecting step comprises the steps of: measuring an energy detect value before packet transmission; detecting an acknowledgment error with respect to a transmitted packet; and identifying an interference error when the acknowledgment error is detected with respect to the packet transmitted under a condition that the measured energy detect value exceeds an interference deciding threshold.

The present application is based on Japanese Patent Application No. 2006-205395, filed on Jul. 27, 2006, the entire content of which is expressly incorporated by reference herein.

Industrial Applicability

The wireless communication apparatus, wireless LAN system, interference detecting method and interference avoidance method according to the present invention have the effect of detecting interference and avoiding the interference and are especially effective for a wireless communication apparatus making up a wireless LAN system that connects a plurality of wireless communication apparatuses via a wireless network and a wireless communication control method.

The invention claimed is:

1. A wireless communication apparatus comprising:
a communication status deciding circuit that decides a wireless communication status by measuring an interference level;
a packet error detecting circuit that detects an error with a transmitted or received packet;
an interference error deciding circuit that decides an interference error has occurred from an interference source when the wireless communication status decided in the communication status deciding circuit shows a predetermined interference decision condition and an error is detected in the packet error detecting circuit; and
an interference avoidance control circuit that fixes a transmission rate of the wireless communication apparatus when it is decided that the interference error has occurred,
wherein the communication status deciding circuit measures a noisefloor value of when a packet is received.

2. wireless communication apparatus comprising:
a communication status deciding circuit that decides a wireless communication status by measuring an interference level
a packet error detecting circuit that detects an error with a transmitted or received packet;
an interference error deciding circuit that decides an interference error has occurred from an interference source when the wireless communication status decided in the communication status deciding circuit shows a predetermined interference decision condition and an error is detected in the packet error detecting circuit; and
an interference avoidance control circuit that fixes a transmission rate of the wireless communication apparatus when it is decided that the interference error has occurred, wherein the communication status deciding circuit measures a noisefloor value when a beacon is received.

3. An interference detecting method comprising:
measuring a noisefloor value of when a packet is received;
detecting a reception error with the received packet including a frame check sequence error;
identifying an interference error when the reception error is detected with the packet received under a condition that the measured noisefloor value exceeds an interference deciding threshold; and
fixing a transmission rate when the interference error is identified.

4. An interference detecting method comprising:
measuring a noisefloor value of when a beacon is received;
detecting a reception error with a received packet including a frame check sequence error;
identifying an interference error when the reception error is detected with the packet received under a condition that the measured noisefloor value exceeds an interference deciding threshold; and
fixing a transmission rate when the interference error is identified.

* * * * *